United States Patent [19]

Kelly et al.

[11] 4,449,186
[45] May 15, 1984

[54] TOUCH PANEL PASSENGER SELF-TICKETING SYSTEM

[75] Inventors: Guy M. Kelly, La Jolla; John B. Roes, San Diego; Samuel B. Walker, Coronado; Bruce A. Beach, San Diego, all of Calif.

[73] Assignee: Cubic Western Data, San Diego, Calif.

[21] Appl. No.: 311,906

[22] Filed: Oct. 15, 1981

[51] Int. Cl.³ .............................................. G07F 7/08
[52] U.S. Cl. .................................. 364/407; 364/900; 364/401
[58] Field of Search ....................... 364/900, 401, 407

[56] References Cited

U.S. PATENT DOCUMENTS

| | | | |
|---|---|---|---|
| 3,445,633 | 5/1969 | Ratner | 364/900 |
| 3,533,084 | 10/1970 | Cook et al. | 364/900 |
| 3,622,995 | 11/1971 | Dilks et al. | 364/407 |
| 3,668,654 | 6/1972 | Doersam, Jr. | 364/200 |
| 3,688,276 | 8/1972 | Quinn | 364/900 |
| 3,750,103 | 7/1973 | Angus et al. | 364/900 |
| 3,931,761 | 1/1976 | Carrus et al. | 364/900 |
| 4,247,759 | 1/1981 | Yuris et al. | 340/153 |

Primary Examiner—Jerry Smith
Assistant Examiner—Jameson Lee
Attorney, Agent, or Firm—Brown & Martin

[57] ABSTRACT

An automated system for vending airline tickets to credit card purchasers based upon reservation data stored in a central host computer, without the intervention of any ticket agents. A plurality of remote ticket terminals each include a credit card reader, video monitor, ticket printer, local computer, and an interface for permitting communication with the host computer. The local computer of each terminal reads data from an inserted credit card and causes the video monitor to display alphanumeric and graphic inquiries to the purchaser regarding the passenger's reservation. The CRT of the video monitor is provided with touch input mechanisms for enabling the passenger to respond to the inquiries by placing a finger on a visual response target. The local computer interrogates the host computer to determine the purchaser's reservation data and displays the reservation data on the CRT for confirmation by the purchaser. Upon confirmation, the local computer causes the ticket printer to generate and dispense a corresponding ticket and sends a transaction report to the host computer for immediate revenue accounting.

5 Claims, 7 Drawing Figures

TOUCH PANEL PASSENGER SELF-TICKETING SYSTEM

BACKGROUND OF THE INVENTION

The present invention relates to automatic ticket dispensing equipment, and more particularly, to a passenger self-ticketing system particularly adapted for vending airline tickets based upon reservation data stored in a central host computer.

For some time, commercial airlines have stored passenger reservation data in a central host computer. Ticket issuing has required that a ticket agent interrogate the host computer from a CRT/keyboard input terminal to confirm the reservation and to thereafter receive payment. The principal drawback of this approach is that it is simply too slow, and consequently, long lines of passengers waiting to purchase their tickets are a common sight in many airline terminals.

More recently, Cubic Western Data, the assignee of the present application, has introduced a self-service passenger ticketing system to commercial airlines. That system, which is disclosed in U.S. Pat. No. 4,247,759, comprises a plurality of microprocessor controlled terminals, each of which communicates with a central credit computer, but not with a central computer storing reservation information. Each of the terminals has a credit card reader, a modem, destination selection buttons, and a printer. The issuing of a ticket by each terminal is conditional only upon the passage of status checks and the passage of a credit check. No reservation interrogation is required. The self-service passenger ticketing system of the aforementioned U.S. Pat. No. 4,247,759 is well adapted for issuing tickets for flights in high capacity corridors, such as New York to Washington, D.C. Many commuters who travel such corridors purchase tickets shortly before their desired flights and are able to board airplanes without reservations.

Also of interest in this field are U.S. Pat. No. 3,445,633; U.S. Pat. No. 3,622,995; and U.S. Pat. No. 3,750,103. They disclose a variety of complex on-line data processing systems for simultaneously handling passenger reservation, ticketing and boarding functions. In general the systems disclosed in these patents include a large central processor and an addressable data store for reservation and customer account information.

It would be desirable to provide a passenger self-ticketing system for vending airline tickets based upon reservation data stored in a central host computer. Preferably such a system would incorporate a highly adaptable audio-visual interactive display system for leading the passenger through a series of steps to locate and confirm reservation data prior to printing and dispensing a ticket. Preferably the system would be credit card operated since an every increasing number of airline tickets are purchased by credit card. In addition, preferably the system would immediately report transaction data to the central host computer to thereby reduce the cost of credit card charge float.

SUMMARY OF THE INVENTION

It is therefore the primary object of the present invention to provide an improved passenger self-ticketing system for vending airline tickets based upon reservation data stored in a central host computer.

It is another object of the present invention to provide a self-ticketing system of the aforementioned type which utilizes an audio-visual interactive display system for leading the passenger through a series of steps that will locate the reservation data, confirm the same, and issue a ticket based upon the reservation data.

Still another object of the present invention is to provide a self-ticketing system of the aforementioned type which will immediately report transactions to the host computer to thereby reduce the cost of credit card charge float.

Yet another object of the present invention is to provide a self-ticketing system of the aforementioned type which includes a CRT equipped with a touch panel input.

Another object of the present invention is to provide a self-ticketing system of the aforementioned type in which changes in fare levels can be made at the central host computer and down loaded to all self-ticketing system terminals simultaneously.

Another object of the present invention is to provide a self-ticketing system of the aformentioned type in which transaction reports can also be stored locally.

Still another object of the present invention is to provide a self-ticketing system of the aforementioned type which does not have destination selection buttons and other physical features which must be configured for a particular airlines, but instead utilizes pre-programmed scenarios which are displayed on a CRT and which may be easily and quickly adapted to meet the particular needs of different airlines.

Accordingly, the illustrated embodiment of the present invention provides an automated system for vending airline tickets to credit card purchasers based upon reservation data stored in a central host computer, without the intervention of any ticket agents. A plurality of remote ticket terminals each include a credit card reader, video monitor, ticket printer, local computer, and an interface for permitting communication with the host computer. The local computer of each terminal reads data from an inserted credit card and causes the video monitor to display alphanumeric and graphic inquiries to the purchaser regarding the passenger's reservation. The CRT of the video monitor is provided with touch input mechanisms for enabling the passenger to respond to the inquiries by placing a finger on a visual response target. The local computer interrogates the host computer to determine the purchaser's reservation data and displays the reservation data on the CRT for confirmation by the purchaser. Upon confirmation, the local computer causes the ticket printer to generate and dispense a corresponding ticket and sends a transaction report to the host computer for immediate revenue accounting.

DESCRIPTION OF THE PREFERRED EMBODIMENT

Figure 1:
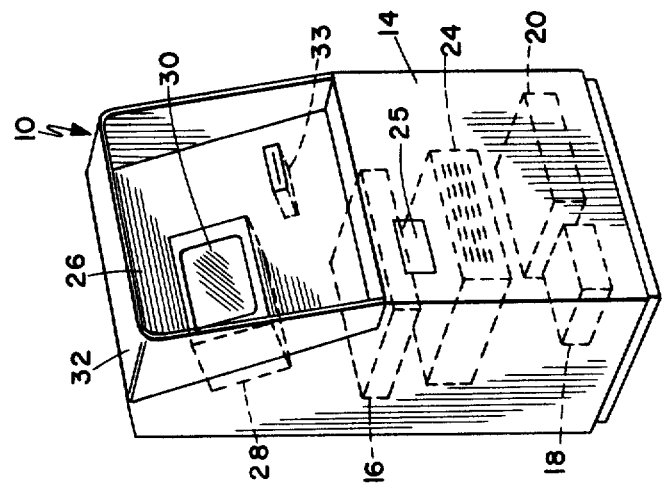
FIG. 1 is a perspective view of a preferred embodiment of one of the ticket terminals of the present invention, illustrating internal components in phantom lines.

The self-ticketing system of the present invention includes a plurality of electro-mechanical ticket terminals 10 (FIG. 1). These terminals are placed at locations that are convenient to potential ticket purchasers. For example, they may be placed adjacent conventional agent manned ticket counters in airports. The ticket terminals each communicate with a central host computer 12 (FIG. 2) where passenger reservation data, credit information and transaction reports are stored. Most major airlines already have such host computer systems which are typically interconnected with a plurality of agent operated CRT/keyboard input terminals (not shown).

Figure 2:
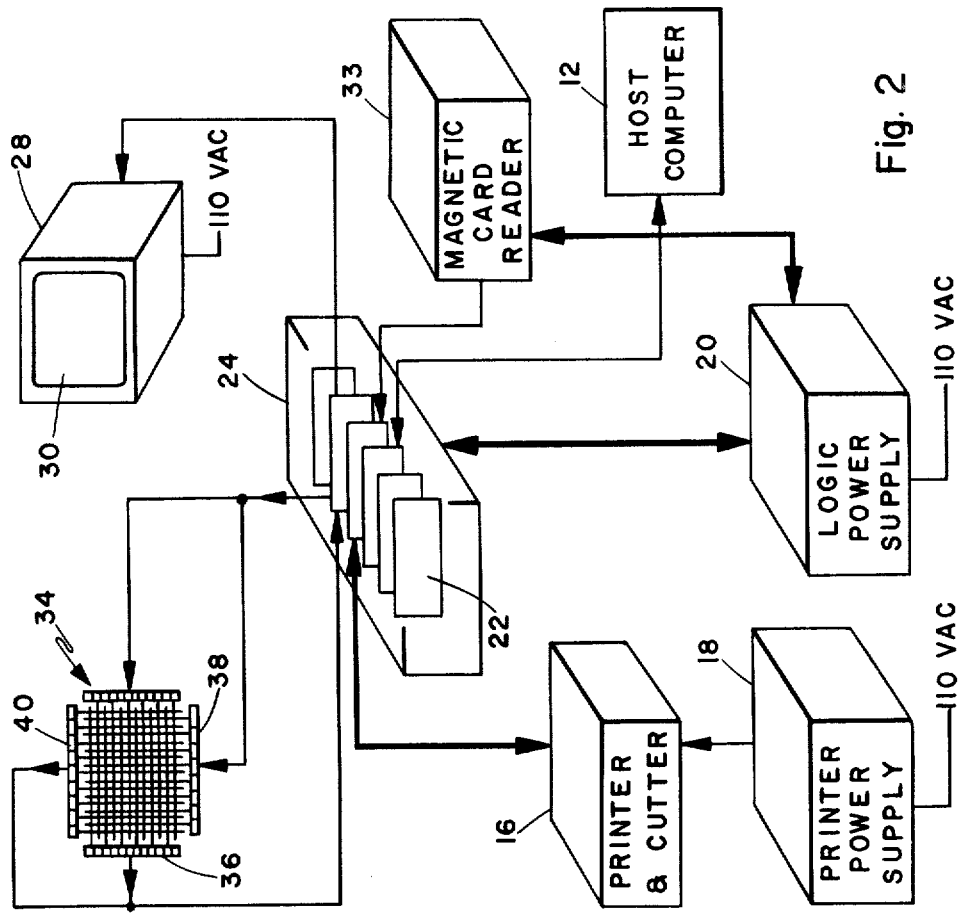
FIG. 2 is a pictorial diagram illustrating the relationship of the components of the terminal of FIG. 1 to the central host computer.

Each of the ticket terminals 10 of the present invention includes an upright cabinet 14 (FIG. 1) which houses various operative components of the monitor. As shown in FIGS. 1 and 2, these include a printer/cutter module 16, a printer power supply 18 and a logic power supply 20. In addition, various processing electronics are mounted on PC boards 22 (FIG. 2) which are mounted in a card cage 24.

The printer/cutter module 16 may be a TALLY M-78. That unit is a forms access printer fitted with a ticket shear. Its printer is an 80-column, row-printing device with a font of dot-matrix formed characters. The dispensed ticket may be delivered through a ticket chute 25 on the front of the cabinet.

Ticket delivery is accomplished immediately after printing and cutting are completed and the credit card removed. The latter action unlocks the cover on the ticket bin to allow ticket removal. Recognized malfunctions that predicate ticket retention will put the terminal out of service, and the ticket purchaser will be advised through a message on the CRT 30 to seek the assistance of a ticket agent.

The cabinet 14 (FIG. 1) is provided with an inclined face panel 26. A video monitor 28 is supported within the cabinet so that its CRT 30 is visible through a cutout region in the face panel 26. A hood 32 projects from the periphery of the face panel 26 to reduce glare and thereby better enable a ticket purchaser to view displays generated on the monitor 28. By way of example, the video monitor 28 may be a color type having a thirteen inch diagonal screen and a speaker for transmitting audible tones, hereinafter described. One suitable color monitor is available from ZENITH CORPORATION.

A credit card reader 33 (FIG. 1) is mounted in a slot in the face panel 26 so that a ticket purchaser can readily insert his or her credit card therein. One suitable credit card reader is the VERTEL CR 21 semi-capture type card reader. This type of card reader has a moving head and allows the ticket purchaser to keep his or her credit card in view at all times. A card present sensor (not shown) is used to generate card error messages and may be programmed to cancel and reset the terminal if the card is removed before the transaction is completed. The credit card reader motor is under the control of a local computer mounted within the terminal. This enables multiple read attempts by the card reader, if required.

The video monitor 28 is capable of displaying standard external television video as well as internal alphanumeric characters and graphics digitally generated by the processing electronics of the terminal. The video display may be used for advertising between ticket sales. When the machine is actually used by a passenger, alphanumeric and graphic information is displayed on the CRT 30 in order to instruct the passenger in the use of the machine. In use, the generated display consists of a series of inquiries designed to prompt passenger input.

Passenger response to the displayed inquiries is made through the utilization of a touch input device 34 (FIG. 2) associated with the CRT 30. Specifically, the passenger is able to respond to an inquiry by placing the end of his or her index finger in contact with the CRT over a visual response target displayed on the CRT next to a possible answer. By way of example, the touch panel device 34 may consist of a series of infrared emitters and receivers mounted around the periphery of the face of the CRT 30. These sensors are capable of locating an input position with an accuracy of, for example, within one-tenth of an inch. An infrared emitter mounted on one side edge of the CRT face transmits a beam to a receiver mounted on the opposite side edge of the CRT face. When a finger breaks this beam a certain X or Y access position is determined.

As illustrated in FIG. 2, the infrared emitters and receivers define an X/Y coordinate grid of beams which may be used to precisely locate the position of a finger placed on the face of the CRT. The rows of infrared emitters and receivers which are positioned adjacent the side edges of the face of the CRT are indicated with the reference numerals 36 and 38 in FIG. 2. The grid of beams is indicated by the reference numeral 40 in FIG. 2. One suitable touch panel input device of the aforementioned type is manufactured by CARROLL. Other suitable touch panel input means may be utilized, such as those employing ultrasonic components or those employing elastomers over the face of the CRT.

Since there is no tactile feedback to the passenger, an audible "beep" tone, together with a change in the display is used to acknowledge an input. The video monitor 28 preferably includes an audio amplifer and speaker to produce the audible tones during the ticket purchasing operation in response to signals from the processing electronics.

Figure 3:
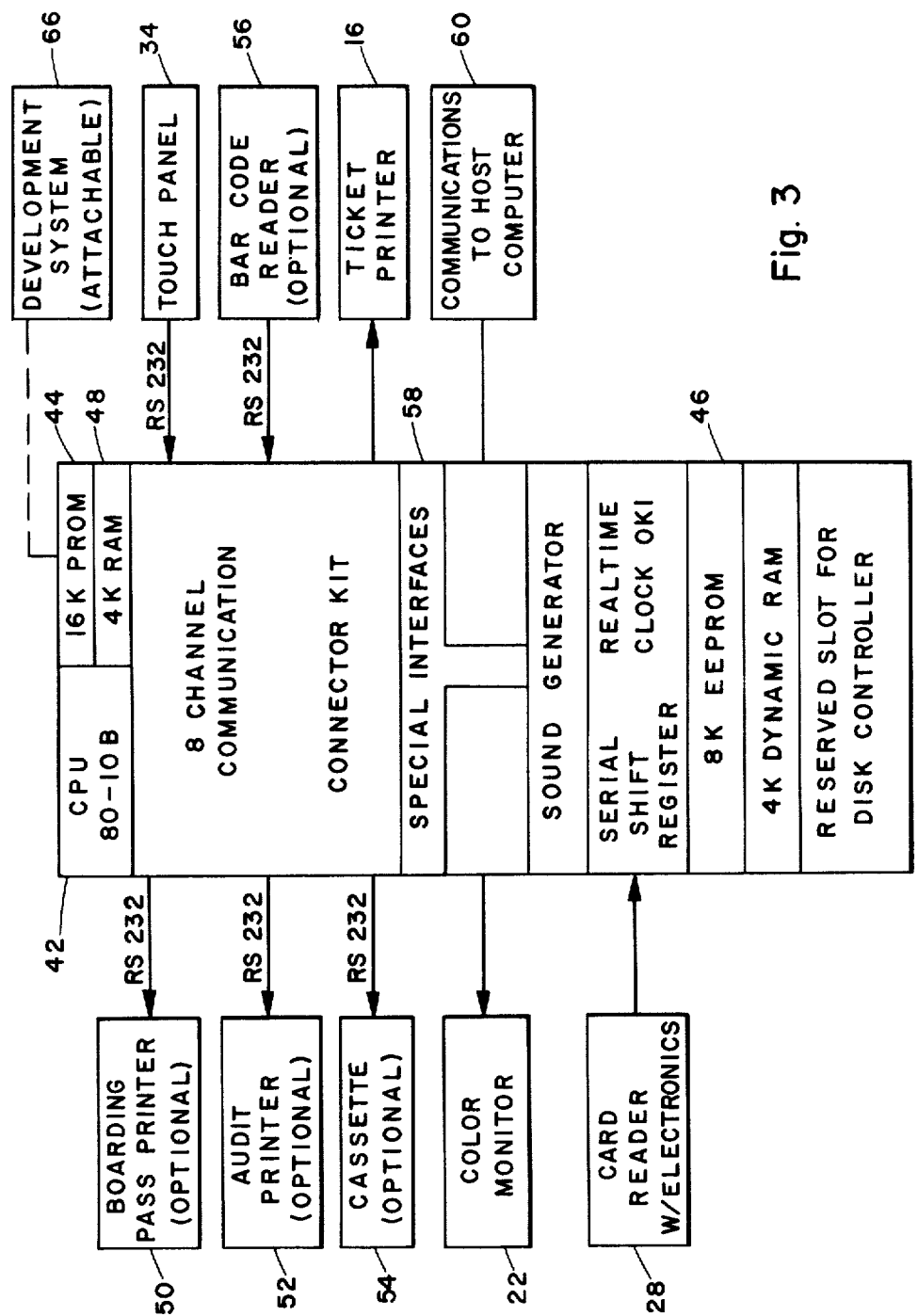
FIG. 3 is a functional block diagram of the terminal illustrated in FIGS. 1 and 2.

A functional block diagram of the electronics of the terminal 10 is illustrated in FIG. 3. The terminal 10 includes a local computer or CPU 42 which preferably comprises multibus circuit boards using the INTEL 8080 family of integrated circuits. The CPU is provided with 16K of basic program PROM memory 44, along with 8K of alterable data in EEPROM 46. Four kilobytes of RAM 48 are protected for electronic register and transaction-pending data. Peripheral units are supported through RS 232 serial communications interfacing devices. As shown in the block diagram, serial ports are available for a variety of options for monitoring transactions and controlling separate printing devices. These include an optional boarding pass printer 50, audit printer 52, cassette 54, and bar code reader 56.

Special interfaces 58 (FIG. 3) are provided between the CPU 42 and the various peripheral devices. For example, a type 8741 printer control may be utilized between the CPU and the ticket printer 16. The special interfaces 58 may further include a type 8741 card reader interface, a type 8251A touch panel interface, a type AY-3-8912 sound generator, a non-volatile RAM and a VCR interface.

The terminal 10 communicates with the central host computer 12 through a universal peripheral interface 60 having its own CPU, RAM, ROM, and programmable communications interface capable of supporting data transfer rates of up to, for example, 9600 baud. Together, these devices provide a pseudo terminal and buffering compatible with the communications net speeds, procedures, and protocols of typical host computers already in use by commercial airlines for storing reservation data and other information.

The CPU 42 includes circuitry for generating the graphics and alphanumerics which are displayed on the monitor 22. By way of example, the CPU may include a TMS 9918 video generator available from TEXAS INSTRUMENTS along with a suitable video memory.

A source listing of a representative operational program which may be stored in the memory of the CPU 42 is set forth hereafter in Table I.

TABLE I

```
SCREEN    00051    0033

0: ( AIRLINES UTILITIES    STOA, ATOS,           08-20-80) FEX    0:
                                                                   1:
 2:     : AIRLINES ; ( EASY TO REMEMBER FOR FORGET )               2:
 3:                                                                3:
 4:     : STOA, XCHG, M: A: MOV, HL: INX, HL: INX, XCHG, ;         4:
 5:     ( MOVES TOP OF STACK TO A )                                5:
 6:                                                                6:
 7:     : ATOS, XCHG, HL: DCX, 0 M: MVI, HL: DCX, A: M: MOV, XCHG, ; 7:
 8:     ( MOVES CONTENTS OF A TO TOP OF STACK )                    8:
 9:                                                                9:
10: CODE >R    BC: POP,            XCHG, DGET, XCHG, HL: PUSH,    10:
11:            BC: PUSH, RET, ENDCODE                             11:
12: CODE R>    BC: POP,  HL: POP, XCHG, DPUT, XCHG,               12:
13:            BC: PUSH, RET, ENDCODE                             13:
14:                                                               14:
15:                                                   --> JRP     15:

SCREEN    00052    0034

0: ( AIRLINES UTILITIES    PORT FETCH/STORE      08-20-80) HEX    0:
 1:                                                                1:
 2:     : P@ 20 WORD NUMBER SWAP DROP IN, ATOS, ; !IMPERATIVE      2:
 3:     ( INPUT FROM A PORT  P@ PORT # )                           3:
 4:                                                                4:
 5:     : P! 20 WORD NUMBER SWAP DROP STOA, OUT, ; !IMPERATIVE     5:
 6:     ( OUTPUT TO A PORT P! PORT # DATA )                        6:
                                                                   7:
 8:                                                                8:
 9:                                                                9:
10:                                                               10:
11:                                                               11:
12:                                                               12:
13:                                                               13:
14:                                                               14:
15:                                                   --> JRP     15:

SCREEN    00053    0035

0: ( AIRLINES UTILITIES    PRESCALER/BYTERCT     08-20-80) HEX    0:
 1:                                                                1:
 2:     : PRESCALE 56 P! 2B   ( SET MODE 3 TO COUNTER 1  )          2:
 3:             28 P! 29 ;   ( SET PRESCALER TO 1.2 MSEC. )         3:
 4:                                                                4:
 5:                                                                5:
 6:     CODE BYTERCT 8 B: MVI, STOA,    ( ROTATE A BYTE )           6:
 7:         BEGIN, RRC, A: H: MOV, L: A: MOV, RAL, A: L: MOV,       7:
 8:         H: A: MOV, B: DCR, Z: END, L: A: MOV, ATOS, RET, ENDCODE 8:
 9:                                                                9:
10:                                                               10:
11:                                                               11:
12:                                                               12:
13:                                                               13:
14:                                                               14:
15:                                                   --> JRP     15:
```

```
SCREEN   00054   0036

0: ( AIRLINES UTILITIES    TIMER/CARD IN PLACE       08-20-80) HEX
 1:
 2: ( TIMESET EXPECTS TWO BYTES ON STACK TO STORE IN COUNTER   )
 3:
 4: : TIMESET   PRESCALE           ( SET CLOCK TO 1 MSEC    )
 5:            P0 P! 2B            ( SET MODE 0 CTR 2       )
 6:               P! 2A
 7:               P! 2A  ;
 8:
 9: : TIMEOUT  P@ 2B 4 AND 0 = ;   ( CHECKS TIMER TIMOUT    )
10:
11: : CIP  P@ 2B NOT 10 AND ;      ( CARD IN PLACE ?        )
12:
13:
14:
15:                                                      --> JRB

SCREEN   00055   0037

0: ( AIRLINES UTILITIES    BUFFER DEFINITIONS         08-20-80) HEX
 1:
 2:  3000   :C  PBUF                    ( PRINT BUFFER            )
 3:         :V  PBUFPTR PBUF PBUFPTR !  ( PRINT BUFFER POINTER    )
 4:         :V  PNTR                    ( PRINT SCREEN POINTER    )
 5:
 6: : PBUF!  PBUFPTR @ DUP 1+           ( STORE DATA FROM         )
 7:          PBUFPTR ! B! ;             ( SCRN PNTR IN PBUF       )
 8:
 9: : BUF!  PNTR @ DUP 1+ PNTR ! B! ;   ( GET PNTR STR DATA INCREM )
10:
11: : BUF@  PNTR @ DUP 1+ PNTR ! B@ ;   ( FETCH DATA              )
12:
13:
14:
15:                                                      --> JRB

SCREEN   00056   0038

0: ( AIRLINES UTILITIES    COLOR DEFINITIONS          09-03-80) HEX
 1:
 2:     00 :C  TRANS      08 :C  MRED      04 :C  K1      0C :C  K9
 3:     01 :C  BLACK      09 :C  LRED      05 :C  K2      0D :C  K*
 4:     02 :C  MGREEN     0A :C  DYELLOW   06 :C  K3      0E :C  K0
 5:     03 :C  LGREEN     0B :C  LYELLOW   07 :C  K4      0F :C  K#
 6:     04 :C  DBLUE      0C :C  DGREEN    08 :C  K5
 7:     05 :C  LBLUE      0D :C  MAGENTA   09 :C  K6      ( TEN KEY PAD )
 8:     06 :C  DRED       0E :C  GRAY      0A :C  K7      ( SPRITE #'S  )
 9:     07 :C  CYAN       0F :C  WHITE     0B :C  K8
10:
11:     10 :C  LOGO1      15 :C  LOGO5     ( CUBIC LOGO SPRITES )
12:     11 :C  LOGO2      16 :C  LOGO6
13:     12 :C  LOGO3      18 :C  LOGO7     :V CITY
14:     14 :C  LOGO4      19 :C  LOGO8
15:                       1A :C  LOGO9                DECIMAL ;S  JEC

SCREEN   00057   0039

0: ( AIRLINES INTERFACE    LD.VREG.R                  08-20-80) HEX
 1:
 2:     21      :C  VREGOUTPORT  ( HEX ADDRESS OF VDP REGISTERS)
 3:
 4:  CODE LD.VREG.R STOA, VREGOUTPORT OUT, STOA, 80 ORI,
 5:                 VREGOUTPORT OUT, RET, ENDCODE
 6:
 7: ( THIS ROUTINE LOADS A DATA BYTE INTO VDP REGISTER R )
```

```
 8:   ( IT PRE-SUPPOSSES THAT THE DATA TO BE LOADED IS ON THE )      8:
 9:   ( STACK, WITH THE REGISTER NUMBER IMMEDIATELY BELOW )           9:
10:                                                                  10:
11:                                                                  11:
12:                                                                  12:
13:                                                                  13:
14:                                                                  14:
15:                                                          --> JHF 15:

SCREEN   00058   003A

0: ( AIRLINES INTERFACE     VRAM ACCESS WORDS      08-20-80) HEX     0:
 1:                                                                   1:
 2:   CODE   LD.VRAM.ADDR    XCHG, BGET, XCHG, C: A: MOV,             2:
 3:          VREGOUTPORT OUT, B: A: MOV, 40 ORI, VREGOUTPORT OUT,     3:
 4:          RET, ENDCODE    ( LOADS TOS AS VRAM ADDRESS )            4:
 5:                                                                   5:
 6:   CODE   WT.VRAM.DATA    XCHG, BGET, DGET, XCHG,                  6:
 7:          BEGIN,  M: A: MOV, 20 OUT, HL: INX, BC: DCX, A: INR,     7:
 8:          A: INR, B: A: MOV, C: ORA, Z:   ( TOS IS BYTE COUNT )    8:
 9:          END, RET, ENDCODE              ( NEXT IS RAM ADDR. )     9:
10:                                         ( MOVES DATA TO VRAM )   10:
11:                                                  DECIMAL ;S  BW  11:
12:                                                                  12:
13:                                                                  13:
14:                                                                  14:
15:                                                                  15:

SCREEN   00059   003B

0:                                                                   0:
 1:                                                                   1:
 2:                                                                   2:
 3:                                                                   3:
 4:                                                                   4:
 5:                                                                   5:
 6:                                                                   6:
 7:                                                                   7:
 8:                                                                   8:
 9:                                                                   9:
10:                                                                  10:
11:                                                                  11:
12:                                                                  12:
13:                                                                  13:
14:                                                                  14:
15:                                                                  15:

SCREEN   00060   003C

0: ( AIRLINES EDITORS       VARIABLES, CONSTANTS   09-02-80) HEX     0:
 1: :V PDCN    ( DISK BUFFER COUNTER) :V PDBS  ( DISK BUFFER START)   1:
 2:         :V PIXEL   ( # OF CHARACTERS/COLUMN   ) D01A :C BASE      2:
 3:         :V COLUMN  ( # OF COLUMNS/LINE        ) ( RADIX   ADR)    3:
 4:   D022  :C MSGP        ( MESSAGE POINTER LOCATION       )         4:
 5:   00    :C VIDEO       ( CONTAINS ADDRESS OF VIDEO TABLE )        5:
 6:   00    :C VSTART      ( DP BEFORE VIDEO COMPILATION     )        6:
 7:   AA    :C BSCR        ( START OF BOILER PLATE SCREENS   )        7:
 8:   BB    :C ASCR        ( START OF ASCII  SCREENS         )        8:
 9:   CB    :C SSCR        ( START OF SPRITE SCREENS         )        9:
10:   2000  :C TABLE.A     ( BASE ADDRESS FOR VRAM MIRROR    )       10:
11:         TABLE.A            :C PAT.GEN    ( PATTRN GENERATOR )    11:
12:         TABLE.A 800 +      :C SPR.GEN    ( SPRITE GENERATOR )    12:
13:         TABLE.A C00 +      :C PAT.NAME   ( PATTRN NAMES     )    13:
14:         TABLE.A F00 +      :C PAT.COLOR  ( PATTRN COLORS    )    14:
15:         TABLE.A F80 +      :C SPR.NAME              --> JHF      15:
```

```
SCREEN    00061    003D

0: ( AIRLINES EDITORS      DISPLAY SECTION       08-29-80) HEX
 1:   : PIXELS    PIXEL @       ;    : COLUMNS   COLUMN @    ;
 2:   : PDCN@     PDCN @        ;    : PDBS@     PDBS @      ;
 3:   : CLEAR     7E CCUT 1C CCUT    ;
 4:   : LINE      COLUMNS @
 5:             DC MSG" \" PIXELS 0
 6:               DO PDCN@ @ COUT 1 PDCN +! LOOP
 7:             LOOP MSG" \" CRLF ;
 8:   : FRAME     CCLUMNS @
 9:             DO MSG" +" PIXELS 0
10:               DO MSG" -" LOOP
11:             LOOP MSG" +" CRLF ;
12:   : AHEAD     DUP 7F > IF MSG" ILLEGAL ASCII #" . ABORT ENDIF
13:             8 / DUP CLEAR MSG" ASCII" 8 * DUP .
14:             MSG"   THRU" 7 + . CRLF CRLF  FRAME ASCR + ;
15:                                                               --> JHF

SCREEN    00062    003E

0: ( AIRLINES EDITORS      DISPLAY SECTION       08-20-80) HEX
 1:
 2:   : SHEAD     DUP 1F > IF MSG" ILLEGAL SPRITE #" . ABORT ENDIF
 3:             4 / DUP CLEAR MSG" SPRITES" 4 * DUP . MSG"    THRU"
 4:             3 + . CRLF CRLF FRAME SSCR + ;
 5:
 6:   : DISPLAY  ?SCR BLOCK DUP PDCN ! PDBS !
 7:             10 0 DO LINE LOOP FRAME ;   ( PRINTS DISPLAY )
 8:
 9:   : FBIN     0
10:             BEGIN DROP KPIN DUP 7E =
11:             ENDF ;
12:
13:   : CURSOR   11 7E 4 0
14:             DO COUT
15:             LOOP ;                                             --> JHF

SCREEN    00063    003F

0: ( AIRLINES EDITORS      EDIT SUBROUTINES      08-20-80) HEX
 1:
 2:   : POINT    PDBS@ - DUP DUP 400 < SWAP -1 > AND
 3:             IF DUP PDBS@ + PDCN ! 40 /MOD 3 + SWAP
 4:               DUP PIXELS / 1+ + CURSOR
 5:             ELSE BEEP DROP
 6:             ENDIF ;
 7:   : POINTER  PDCN@ + POINT ;
 8:
 9:   : ABSTAB   PDBS@ - PIXELS / PIXELS * PDBS@ + + POINT ;
10:   : RELTAB   PDCN@ ABSTAB ;
11:
12:   : UPDATE   PDBS@ 2- DUP @ ;
13:   : EXIT     SWAP ! SWAP 1+ SWAP    ;
14:
15:   : REPLACE  DUP COUT PDCN@ B! 1 POINTER ;                     --> JHF

SCREEN    00064    0040

0: ( AIRLINES EDITORS      EDIT FUNCTIONS        08-20-80) HEX
 1:
 2:   : SPACE    2E REPLACE ;   : DEFAULT   60 REPLACE ;
 3:
 4:   : CTRLE    UPDATE 8000 OR EXIT ;  : TAB      PIXELS RELTAB ;
 5:
 6:   : CTRLQ    UPDATE 7FFF AND EXIT ; : INPUT    DUP REPLACE   ;
 7:
 8:   : UP       -40 POINTER ;          : DOWN     40 POINTER    ;
```

```
 9:                                                                        9:
10: : LEFT       -01 POINTER ;         : RIGHT      01 POINTER    ;       10:
11:                                                                       11:
12: : CR         40 RELTAB ;           : BACKTAB  0 PDCN@ 1- ABSTAB ;     12:
13:                                                                       13:
14: : VERT       60 = IF DOWN LEFT ENDIF ;                                14:
15:                                                              --> JHF  15:

SCREEN    00065    0041

0: ( AIRLINES EDITORS      MODIFY DEFINITION       08-20-80) HEX          0:
 1:                                                                        1:
 2: : KEYCASE   DUP     CASE[                                              2:
 3:    NULL     BEEP    BEEP     BEEP     BEEP     CTRLE   BEEP    BEEP    3:
 4:    LEFT     TAB     DOWN     DOWN     UP       CR      BEEP    PEEP    4:
 5:    RIGHT    CTRLQ   PEEP     PEEP     PACKTAB  PEEP    PEEP    PEEP    5:
 6:    BEEP     BEEP    BEEP     BEEP     BEEP     BFEP    BEEP    BEEP    6:
 7:    SPACE    DEFAULT ]CASE    VERT     ;                                7:
 8:                                                                        8:
 9: : MODIFY       DISPLAY -400 POINTER                                    9:
10:                 PEGIN 0 KBIN KEYCASE                                  10:
11:                 END PDBS @ 2- @ 8000 AND                              11:
12:                 IF   FLUSH                                            12:
13:                 ELSE ERASE                                            13:
14:                 ENDIF 14 0 CURSOR ;                                   14:
15:                                                              --> JHF  15:

SCREEN    00066    0042

0: ( AIRLINES EDITORS      ASCII / SPRITE EDITORS  08-20-80) HEX          0:
 1:                                                                        1:
 2: : ASCII      08 PIXEL ! 8 COLUMN ! AHEAD MODIFY ERASE ;                2:
 3:                                                                        3:
 4: : SPRITE     10 PIXEL ! 4 COLUMN ! SHEAD MODIFY ERASE ;                4:
 5:                                                                        5:
 6:    DELETE    KEYCASE                                                   6:
 7:                                                                        7:
 8:                                                                        8:
 9:                                                                        9:
10:                                                                       10:
11:                                                                       11:
12:                                                                       12:
13:                                                                       13:
14:                                                                       14:
15:                                                              --> JHF  15:

SCREEN    00067    0043

0: ( AIRLINES EDITORS      SCREEN EDITOR           08-20-80) HEX          0:
 1:                                                                        1:
 2: : KEYCASE   DUP     CASE[                                              2:
 3:    NULL     ABORT   PEEP     PEEP     PEEP     CTRLE   PEEP    PEEP    3:
 4:    LEFT     TAB     DOWN     DOWN     UP       CR      BEFP    BEEP    4:
 5:    RIGHT    CTRLQ   BEEP     PEEP     PACKTAB  BEEP    PEEP    PEEP    5:
 6:    BEEP     PEEP    PEEP     PEEP     PEEP     PEFP    PEEP    PEEP    6:
 7:    INPUT    ]CASE   DROP ;                                             7:
 8:                                                                        8:
 9: : SCREEN       2 COLUMN ! 20 PIXEL ! CLEAR MSG" SCREEN" DUP .          9:
10:                 CRLF CRLF BSCR + FRAME DISPLAY -400 POINTER           10:
11:                 PEGIN 0 KBIN KEYCASE                                  11:
12:                 END PDBS@ 2- @ 8000 AND                               12:
13:                 IF   FLUSH                                            13:
14:                 ELSE ERASE                                            14:
15:                 ENDIF 14 0 CURSOR ERASE ;                    --> JHF  15:
```

SCREEN    00068    0044

```
 0: ( AIRLINES EDITORS         NON-USER DELETES       08-20-80) HEX
 1:
 2:      DELETE  MODIFY      DELETE  KEYCASE     DELETE  VERT
 3:      DELETE  CR          DELETE  BACKTAB     DELETE  LEFT
 4:      DELETE  RIGHT       DELETE  UP          DELETE  DOWN
 5:      DELETE  INPUT       DELETE  CTRLQ       DELETE  CTRLE
 6:      DELETE  TAB         DELETE  SPACE       DELETE  DEFAULT
 7:      DELETE  REPLACE     DELETE  EXIT        DELETE  UPDATE
 8:      DELETE  RELTAB      DELETE  AESTAB      DELETE  POINTER
 9:      DELETE  POINT       DELETE  CURSOR      DELETE  KFIN
10:      DELETE  DISPLAY     DELETE  SHEAD       DELETE  AHEAD
11:      DELETE  FRAME       DELETE  LINE
12:
13:
14:
15:                                           DECIMAL  ;S  JHF
```

SCREEN    00069    0045

```
 0: ( AIRLINES COMPILERS     BYTE LOADER          08-20-80) HEX
 1:
 2:    CODE 8.BITS     DE: PUSH, 01 BC: LXI, DP LHLD, XCHG,
 3:                                         PDCN LHLD,
 4:                    BEGIN, M: A: MOV, 60 CPI, Z:
 5:                        IF, 31 A: MVI,
 6:                        ELSE, 30 A: MVI,
 7:                        ENDIF, HL: INX, HL: PUSH, BC: PUSH,
 8:                        HL: POP, DE: DAD, A: M: MOV,
 9:                        HL: POP, C: INR, C: A: MOV, 9 SBI, Z:
10:                    END, PDCN SHLD, DE: POP, RET, ENDCODE
11:
12:    : BYTE.LOAD   ?SCR BLOCK PDCN ! 8 HERE B! 80 0
13:                   DO 8.BITS 20 HERE 9 + B! NUMBER SWAP DROP
14:                   LOOP ;
15:                                                     --> JHF
```

SCREEN    00070    0046

```
 0: ( AIRLINES COMPILERS     ASCII & SPRITE LOADERS  08-20-80) HEX
 1:
 2:    : 8.ASCII      2 0       ( TWO HALVES   )  ( GENERATE 8       )
 3:       DO 8 0                ( 8 BYTES/HALF )  ( PATTERNS FROM    )
 4:          DO PIXELS 8 0      ( 8 PATTS/SCR  )  ( TOS @ #PATT .    )
 5:             DO SWAP OVER B! 8 -
 6:          LOOP DROP PIXELS 1- PIXEL !
 7:          LOOP PIXELS 8 + 400 XOR PIXEL !
 8:       LOOP 40 PIXEL +! ;
 9:
10:    : 4.SPRITE     10 0
11:       DO -1 PIXEL +! PIXELS 8 0
12:          DO SWAP OVER B! 10 - LOOP DROP
13:       LOOP   ;
14:
15:                                                     --> JHF
```

SCREEN    00071    0047

```
 0: ( AIRLINES COMPILERS     ASCII & SPRITE LOADERS  08-29-80) HEX
 1:
 2:    CODE BINARY   2 HL: LXI, BASE SHLD, RET, ENDCODE  ( RADIX=2 )
 3:
 4:    : ASCII.LOAD PAT.GEN 43F + PIXEL ! BINARY ASCR 10 + ASCR
 5:         DO I
 6:             BYTE.LOAD 8.ASCII
 7:         LOOP DECIMAL ;
```

```
 8:
 9:   : SPRITE.LOAD  8 0 BINARY
10:           DO SPR.GEN I 1+ 80 * + PIXEL ! I SSCR +
11:               BYTE.LOAD 4.SPRITE
12:           LOOP DECIMAL ;
13:
14:   : LOAD.SET ASCII.LOAD SPRITE.LOAD ;
15:                                                          --> JHF
SCREEN   00072    0048

0: ( AIRLINES COMPILERS     COMPACTION ROUTINE     08-26-80) HEX
 1: : ERR00     MSG" VIDEO ERROR: INSUFFICIENT DICTIONARY SPACE"
 2:             ABORT ;
 3: : ERR10     MSG" VIDEO ERROR: BOILER NOT COMPILED " ABORT ;
 4: : SCRATCH   VSTART IF VSTART DP ! 0 ' VIDEO 3 + ! 0 ' VSTART 3 +
 5:             ! ELSE ERR10 ENDIF ;
 6: : SETUP,    XCHG, BGET, DGET, HL: PUSH, <HL>, ;
 7: : FETCH,    XCHG, M: A: MOV, XCHG, ;
 8: : SPACE?    FETCH, 20 CPI, Z: ;
 9: : START-SPACE,  HL: INX, 80 A: MVI, ;
10: : LAST-BYTE?    DE: INX, BC: DCX, B: A: MOV, C: ORA, Z: ;
11: : DROP-STACK,   DE: POP, ' DROP CALL, ;
12: ( COMPACT                A1 A2 N1 ---                      )
13: (              COMPACTS THE N1 BYTES STARTING AT A2         )
14: (              INTO A1+2 WITH A LENGTH WORD AT A1.         --> JHF
15:

SCREEN   00073    0049

0: ( AIRLINES COMPILERS     COMPACTION ROUTINE     08-20-80) HEX
 1: CODE COMPACTX
 2:         SETUP, HL: PUSH, HL: INX, HL: INX, SPACE?
 3:         IF, 81 A: MVI, ENDIF,
 4:         A: M: MOV, DE: INX, BC: DCX,
 5:         BEGIN, SPACE?
 6:             IF, M: A: MOV, A: ORA, NEG:
 7:                 IF, FF CPI, Z:
 8:                     IF, START-SPACE,
 9:                     ENDIF,
10:                 ELSE, START-SPACE,
11:                 ENDIF, A: INR, A: M: MOV,
12:             ELSE, HL: INX, A: M: MOV,
13:             ENDIF, LAST-BYTE?
14:         END, BC: POP, DROP-STACK, XCHG, PPUT, DPUT, XCHG,
15:         RET, ENDCODE                                     --> JHF

SCREEN   00074    004A

0: ( AIRLINES COMPILERS     VIDEO SUBROUTINES     08-20-80) HEX
 1:
 2: : DCHECK    DP @ CF7F > IF SCRATCH ERR00 ENDIF ;
 3: : ,        DCHECK , ;
 4: : B,       DCHECK B, ;
 5: : COMPACT  COMPACTX 1- OVER - SWAP ! ;
 6:
 7: : LINES    40 * PDBS@ + DUP 20 + SWAP ;
 8:
 9: : LENGTH   HERE 2- OVER - ;
10:
11: : TABLE    HERE 2 DP +! ;
12:
13: : BACKBONE HERE PDBS@ 180 COMPACT HERE @ DP +! ;
14:
15: : LOCATION PDBS@ - 40 /MOD 10 * 9 - B, 8* 10 - B, ;       --> JHF
```

```
SCREEN    00075    004B

0: ( AIRLINES COMPILERS     PLATE COMPILER          08-20-80) HEX
 1:
 2: : DYNAMICS  PDBS@ C 0         ( FINDS RELEATIVE ADDRESSES FOR )
 3:            DO I LINES        ( DYNAMIC DATA FIELDS           )
 4:               DO I B@ OVER B! 1+ LOOP
 5:            LOOP DROP PDBS@ DUP 180 + SWAP
 6:            DO I B@ 40 =
 7:               IF I PDBS@ - , 2020 I ! ENDIF
 8:            LOOP LENGTH SWAP ! ;
 9:
10:            ( PLATE LOADS THE BASIC BOILER PLATE DATA INTO )
11:            ( THE DICTIONARY AND STORES THE LINK BYTE.     )
12:
13: : PLATE     TABLE DYNAMICS BACKBONE 2- 2 DP +! , ;
14:
15:                                                      --> JHF

SCREEN    00076    004C

0: ( AIRLINES COMPILERS     BUTTON COMPILER         08-20-80) HEX
 1:            ( LOADS NAME AND COLOR INTO DICTIONARY       )
 2:            ( FOR SELECTED BUTTONS BY FIRST FINDING      )
 3:            ( A RIGHT PAREN AND THEN PROCESSING THE      )
 4:            ( NEXT TWO WORDS. THE RESULTS ARE STORED     )
 5:            ( IN THE DICTIONARY.                         )
 6:
 7: : NAME/COLOR   BEGIN MSGP @ B@ 29 =
 8:                  IF TRUE
 9:                  ELSE MSGP @ PDBS@ - 430 >
10:                  ENDIF 1 MSGP +!
11:                END 2 0
12:                DO 20 WORD FIND DUP 0=
13:                   IF DROP NUMBER SWAP DROP
14:                   ELSE EXECUTE ENDIF
15:                LOOP 4 * B, B, ;                         --> JHF

SCREEN    00077    004D

0: ( AIRLINES COMPILERS     BUTTON COMPILER         08-20-80) HEX
 1:
 2:            ( COMPILES BUTTON ADDRESSES, NAMES, AND COLORS )
 3:            ( INTO DICTIONARY WITH LENGTH BYTE. DATA IS    )
 4:            ( IN 9918 SPRITE NAME TABLE FORMAT.            )
 5:
 6: : BUTTONS   TABLE 0 SCR ! MSGP @ PDCN ! PDBS@ 20 + MSGP ! C 0
 7:            DO I LINES
 8:               DO I B@ 60 =
 9:                  IF I LOCATION NAME/COLOR 2020 I ! ENDIF
10:               LOOP
11:            LOOP LENGTH OVER ! PDCN@ MSGP ! ;
12:
13:
14:
15:                                                      --> JHF

SCREEN    00078    004E

0: ( AIRLINES COMPILERS     BOILER PLATE COMPILER    08-20-80) HEX
 1:
 2:            ( COMPILES BOILER PLATE, DYNAMIC DATA FIELDS   )
 3:            ( AND BUTTONS INTO THE DICTIONARY. THE         )
 4:            ( CONSTANT "VIDEO" CONTAINS THE ADDRESS OF     )
 5:            ( OF THE FIRST LINK WORD. THERE IS ONE LINK    )
 6:            ( FOR EACH BOILER PLATE. EACH BOILER PLATE     )
 7:            ( HAS A LENGTH WORD AND DATA AFTER ITS LINK WORD )
 8:            ( FOR THE SPRITE NAME TABLE. FOLLOWED BY SIMULAR )
```

```
 9:            ( LENGTH & DATA FOR THE DYNAMIC DATA FIELD POINTERS )     9:
10:            ( AND THE   OMPACTED BOILER PLATE DATA.                )    10:
11:                                                                        11:
12:   : COMPILE  ?SCR + ?SCR BLOCK PDBS ! BUTTONS PLATE HERE 2-            12:
13:             ' VIDEO 3 + ! ERASE ;                                      13:
14:                                                                        14:
15:                                                      DECIMAL  --> JHF  15:

SCREEN    00079    004F

0: ( AIRLINES COMPILERS    NON-USER DELETES          08-20-80) HEX        0:
 1:                                                                        1:
 2:     DELETE  BUTTONS     DELETE NAME/COLOR   DELETE  PLATE              2:
 3:     DELETE  DYNAMICS    DELETE LOCATION     DELETE  PACKBONE           3:
 4:     DELETE  TABLE       DELETE LENGTH       DELETE  LINES              4:
 5:     DELETE  COMPACT     DELETE BINARY       DELETE  COMPACTX           5:
 6:     DELETE  4.SPRITE    DELETE 8.ASCII      DELETE  BYTE.LOAD          6:
 7:     DELETE  START-SPACE.                    DECIMAL       ;S  JHF      7:
 8:                                                                        8:
 9:                                                                        9:
10:                                                                       10:
11:                                                                       11:
12:                                                                       12:
13:                                                                       13:
14:                                                                       14:
15:                                                                       15:

SCREEN    00080    0050

0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:
SCREEN    00081    0051

0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:

SCREEN    00082    0052

0:   0:
```

1: 1:
2: 2:
3: 3:
4: 4:
5: 5:
6: 6:
7: 7:
8: 8:
9: 9:
10: 10:
11: 11:
12: 12:
13: 13:
14: 14:
15: 15:
SCREEN   00083   0053

0: 0:
1: 1:
2: 2:
3: 3:
4: 4:
5: 5:
6: 6:
7: 7:
8: 8:
9: 9:
10: 10:
11: 11:
12: 12:
13: 13:
14: 14:
15: 15:
SCREEN   00084   0054

0: 0:
1: 1:
2: 2:
3: 3:
4: 4:
5: 5:
6: 6:
7: 7:
8: 8:
9: 9:
10: 10:
11: 11:
12: 12:
13: 13:
14: 14:
15: 15:
SCREEN   00085   0055

0: 0:
1: 1:
2: 2:
3: 3:
4: 4:
5: 5:
6: 6:
7: 7:
8: 8:
9: 9:
10: 10:
11: 11:
12: 12:
13: 13:
14: 14:
15: 15:

SCREEN   00086   0056
 0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:
SCREEN   00087   0057
 0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:
SCREEN   00088   0058
 0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:
SCREEN   00089   0059
 0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:

```
SCREEN    00090    005A

0: ( AIRLINES VIDEO           VARIABLES, CONSTANTS     09-02-80) HEX
 1:
 2:              :V TAPE        ( BOOLEAN TELLS IF EX. VIDEO USED  )
 3:              :V COLOUR      ( CURRENT SCREEN COLOR             )
 4:              :V ADDR1       ( GENERAL PURPOSE REGISTER         )
 5:         11   :C STATES      ( NUMBER OF MACHINE STATES         )
 6:       1100   :C DEBUF       ( DECOMPACTION BUFFER              )
 7:       2000   :C TABLE.A     ( BASE ADDRESS FOR VRAM MIRROR     )
 8:
 9: : ERR11   MSG" VIDEO ERROR: ILLEGAL BOILER NUMBER " ABORT ;
10:
11: : TAPEON  TRUE TAPE ! ;   : TAPEOFF   FALSE TAPE ! ;
12:                           TAPEOFF                          --> JHF
13:
14:
15:

SCREEN    00091    005B

0: ( AIRLINES VIDEO            DECOMPACTER              08-20-80) HEX
 1:
 2: ( DECOMP    A1 A2 N1 ---                                          )
 3: (           DECOMPACTS N1 BYTES AT A2 INTO A1. SPACES ARE         )
 4: (           STORED AS A 7-BIT COUNT WITH THE SIGN BIT SET.        )
 5:
 6: CODE DECOMP SETUP,              ( GET PARAMETERS OF STACK.  )
 7:         BEGIN, FETCH, A: ORA, NEG: ( GET A BYTE, SPACES?)
 8:           IF, 7F ANI,              ( IF, MASK OUT MSB      )
 9:             BEGIN, 20 M: MVI,      ( BEGIN, STORE SPACE.   )
10:                   HL: INX,         ( NEXT "TO" ADDRESS.    )
11:                   A: DCR, Z:       ( DEC. SPACE COUNTER.   )
12:             END,                   ( END, WHEN ZERO.       )
13:           ELSE, A: M: MOV, HL: INX, ( ELSE, STORE BYTE     )
14:           ENDIF, LAST-BYTE?        ( ENDIF, LAST BYTE?     )
15:         END, DROP-STACK, RET, ENDCODE                  --> JHF

SCREEN    00092    005C

0: ( AIRLINES VIDEO            PLATE SUBROUTINES        08-26-80) HEX
 1: : ADDR1@   ADDR1 @ ;
 2: : BLANK    1+ SWAP DO 0 I B! LOOP ;
 3: : @SPRITE  VIDEO IF STATES SWAP - VIDEO SWAP 0 DO @ LOOP 2+
 4:            ELSE ERR10 ABORT ENDIF ;
 5:
 6: : MOVE     OVER + SWAP DO I B@ OVER B! 1+ LOOP DROP ;
 7:
 8: : FILLIN   DUP DUP @ + 2+ DEBUF SWAP DUP 2+ SWAP @ DECOMP
 9:            DUP @ 2 / DUP 0=
10:              IF ,DROP
11:              ELSE 0
12:                DO 2+ SWAP 1+ OVER @ DEBUF +
13:                   SWAP DUP 1- B@ MOVE
14:                LOOP DROP
15:              ENDIF ;                                    --> JHF

SCREEN    00093    005D

0: ( AIRLINES VIDEO            PLATE/SPRITE GENERATORS 08-26-80) HEX
 1: : BOIL    PAT.NAME DEBUF 180 + DEBUF
 2:           DO I P@          OVER     P!
 3:              I B@ 80 OR OVER 20 + B!
 4:              DUP DUP 1+ XOR 20 AND
 5:              IF 20 + ENDIF 1+
 6:           LOOP DROP C00 2C00 300 ;
 7: : PLATE   FILLIN BOIL ;
 8:
```

```
 9: : SPRITES   @SPRITE SPR.NAME 7F OVER + BLANK           9:
10:             DUP 2+ SWAP @ DUP 0= IF DROP ELSE 0       10:
11:             DO DUP B@ SPR.NAME I + BI 1+ LOOP         11:
12:             ENDIF ;                                   12:
13: : UPDATE    ROT LD.VRAM.ADDR WT.VRAM.DATA ;           13:
14: : FILL      1+ SWAP DO DUP I BI LOOP DROP ;           14:
15: : COLOR     COLOUR ! ;                        --> JHF 15:

SCREEN  00094  005E

0: ( AIRLINES VIDEO      BOILER PLATE GENERATOR  08-26-80) HEX   0:
 1:                                                               1:
 2: : LDREGS    77 01 1F 00 3C 03 E3 00                           2:
 3:             8 0 DO  I SWAP LD.VREG.R LOOP ;                   3:
 4: : COLORUP   COLOUR @ 2F00 2F7F FILL F00 2F00 80 UPDATE ;      4:
 5: : INIT      2C00 2FFF BLANK LDREGS 0 2000 1000 UPDATE ;       5:
 6: : VON       [ 1 A: MVI, 2F OUT, ] 00 COLOR COLORUP            6:
 7:             2F80 2FFF BLANK     F80 2F80 80 UPDATE            7:
 8:             00 01 LD.VREG.R     07 00 LD.VREG.R ;             8:
 9: : VOFF      [ 0 A: MVI, 2F OUT, ] INIT ;                      9:
10: : BOILER    DUP STATES 1- > OVER 0< OR                       10:
11:             IF ERR11                                         11:
12:             ELSE                                             12:
13:                01 A3 LD.VREG.R SPRITES PLATE UPDATE F80      13:
14:                SPR.NAME 80 UPDATE COLORUP 01 E3 LD.VREG.R    14:
15:             ENDIF ;                               --> JHF    15:

SCREEN  00095  005F

0: ( AIRLINES VIDEO      NON-USER DELETES        08-26-80) HEX   0:
 1:                                                               1:
 2: : FOREGROUND  10 * ;                                          2:
 3: : BACKGROUND  OR ;                                            3:
 4:                                                               4:
 5: : LOADER    VSTART IF SCRATCH ENDIF                           5:
 6:             HERE ' VSTART 3 + ! STATES 0                      6:
 7:             DO I COMPILE LOOP ;                               7:
 8:                                                               8:
 9: : FORGET    VSTART IF SCRATCH ENDIF FORGET ;                  9:
10:                                                              10:
11:    DELETE  FILL       DELETE  SPRITES     DELETE  PLATE      11:
12:    DELETE  BCIL       DELETE  FILLIN      DELETE  DECOMP     12:
13:    DELETE  SPACE?     DELETE  PLANK       DELETE  ADDR1@     13:
14:    DELETE  ADDR1      DELETE  DEBUF       DECIMAL   ;S JHF   14:
15:                                                              15:

SCREEN  00096  0060

0: ( AIRLINES READER     CREDIT CARD READER      08-20-80) HEX   0:
 1:                                                               1:
 2: 1000     :C  CRBUF                     ( CREDIT CARD RD BUF ) 2:
 3:          :V  NAM1PTR                   ( CC NAME POINTER    ) 3:
 4:                                                               4:
 5: : RDY  P@ 25 F0 AND A0 = ;             ( READY STATUS       ) 5:
 6: : OBF  P@ 2B NOT 08 AND  ;             ( BUFFER FULL?       ) 6:
 7: : RDTA P@ 24 DUP 7F = IF ELSE SWAP DROP 2 SWAP ENDIF ;        7:
 8: : RSET CRBUF PBUFPTR !   ;             ( SET BUFFER POINTER ) 8:
 9: : STRT 02 P! 24          ;             ( TELL RDR TO START  ) 9:
10:                                                              10:
11: : TSTBDT   DUP 5F = IF SWAP DROP RSET 2 SWAP ELSE DUP        11:
12:            9F = IF SWAP DROP RSET 3 SWAP ELSE TIMEOUT        12:
13:            IF DROP 1 7F       ENDIF ENDIF ( TST BAD DATA   ) 13:
14:            ENDIF ;                        ( FLAGS OR TIMEOUT) 14:
15:                                                     --> JRP 15:

SCREEN  00097  0061

0: ( AIRLINES READER     CREDIT CARD READER      08-20-80) HEX   0:
 1:                                                               1:
 2: : NAI PNTR @ NAM1PTR !    ;     ( STORE FOR EXEC            ) 2:
```

```
 3:                                                                              3:
 4:  : GETDELIM 4 20 0 DO BUF@ 5F = IF DROP NA! 0 LEAVE ENDIF LOOP ;              4:
 5:                                                                              5:
 6:  : NAME CRBUF PNTR !           ( INITIALIZE POINTER       )                   6:
 7:      BUF@ 25 =                 ( % SIGN=STRT SENT.       )                   7:
 :          IF BUF@ DUP 41 =       ( CHK FOR A FORMAT        )                   8:
 9:            IF DROP NA! 0 ELSE 42 =    ( CHK FOR B FORMAT )                   9:
10:              IF GETDELIM ELSE 4 ENDIF ( GET TO DELIMITER )                   10:
11:            ENDIF ELSE 4 ENDIF ;                                              11:
12:                                                                              12:
13:  ( 4 = WRONG CARD TYPE-NO NAME  )                                            13:
14:  ( 0 = GOT NAME ADDRESS         )                                            14:
15:                                                              --> JRB         15:

SCREEN   00098    0062

0:  ( AIRLINES READER     CREDIT CARD READER       08-20-80) HEX                0:
 1:                                                                              1:
 2:  : CREDIT-CARD CRBUF PBUFPTR !       ( SET UP READ BUFFER  )                 2:
 3:      BEGIN   CIP END                 ( WAIT FOR CARD       )                 3:
 4:      5F FF TIMESET  5                ( SET UP ESCAPE TIMER )                 4:
 5:      RDY    IF DROP STRT 0           ( TELL RDR GO-SET 0=END )               5:
 6:         BEGIN OBF IF RDTA DUP 20 +   ( DATA TO RD BUFFER   )                 6:
 7:            PBUF! TSTBDT 7F =         ( TEST FOR ERRORS/END )                 7:
 8:            ELSE TIMEOUT IF DROP 1 1 ELSE CIP                                 8:
 9:            IF 0 ELSE DROP 1 1 ENDIF ( END ON GOOD   = 0    )                 9:
10:         ENDIF ENDIF END             (    TIMEOUT = 1       )                 10:
11:      ENDIF                          (    5F ERROR= 2       )                 11:
12:      DUP 0= IF DROP NAME  ENDIF ;   (    9F ERROR= 3       )                 12:
13:      ( IF OK PUT NAME ADDRESS IN )  (    NONAME  = 4       )                 13:
14:      ( ADDRESS POINTER ELSE XIT ERR) (   NOT RDY = 5       )                 14:
15:                                         DECIMAL ;S  JRB                     15:

SCREEN   00099    0063

0:  ( AIRLINES SCANNER    USART                    08-20-80) HEX                0:
 1:                                                                              1:
 2:  : URSET 00 P! 23 00 P! 23 00 P! 23 40 P! 23                                 2:
 3:          7B P! 23               ( SET MODE=EVEN,7BIT,64X )                   3:
 4:          14 P! 23 ;             ( ENABLE USART           )                   4:
 5:                                                                              5:
 6:  : URDATA  P@ 23 DUP 38 AND 0 > ( GET STATUS CHK ERRORS  )                   6:
 7:           IF 14 P! 23    MSG" USART ERROR " . 00 02                          7:
 8:           ELSE 02 AND DUP                                                    8:
 9:              IF P@ 22 SWAP ENDIF      ( GET DATA  )                          9:
10:           ENDIF ;                                                            10:
11:                                                                              11:
12:                                                                              12:
13:                                                                              13:
14:                                                              --> JRB         14:
15:                                                                              15:

SCREEN   00100    0064

0:  ( AIRLINES SCANNER    SCAN/SPRITE BIAS         08-29-80) HEX                0:
 1:                                                                              1:
 2:  :V SPRTA    :V SPRTAD      ( SPRITE TABLE POINTERS )                        2:
 3:                                                                              3:
 4:  :V XSCAN    :V YSCAN       ( X-Y SCANNER BIASED VALUES )                    4:
 5:                                                                              5:
 6:  : XBIAS    1F * 0A / 12 + XSCAN ! ;                                         6:
 7:                                                                              7:
 8:  : YBIAS    25 * 0A / 13 + YSCAN ! ;                                         8:
 9:                                                                              9:
10:  : BLINK    BEEP SPRTA @ 3 + DUP B@ SPRTAD ! ( BLINK THE SPRT )              10:
11:             DUP 0 SWAP B! F80 SPR.NAME 80 UPDATE                             11:
12:             00 7F TIMESET BEGIN TIMEOUT END                                  12:
13:             DUP SPRTAD @ SWAP B! F80 SPR.NAME 80 UPDATE                      13:
14:             00 7F TIMESET BEGIN TIMEOUT END DROP ;                           14:
15:                                                              --> JRB         15:
```

```
SCREEN    00101    0065

0: ( AIRLINES SCANNER        COMPARISONS                 08-20-80) HEX     0:
 1:                                                                         1:
 2:   : XCOMP     XSCAN @ SPRTA @ 1+ P@ ,DUP <          ( GET SPRT ADD )    2:
 3:              IF ,DROP 0 ELSE  20 + < ENDIF ; ( LEAVE RESULT ON )        3:
 4:                                             ( STK FOR CALLING ROUT )    4:
 5:                                                                         5:
 6:   : YCOMP    YSCAN @ SPRTA @    B@ ,DUP < ;                             6:
 7:              IF ,DROP 0 ELSE  20 + < ENDIF ;                            7:
 8:                                                                         8:
 9:  ( THE DELTA FOR X IS 20 ; Y HAS 20 --POINTS BETWEEN ARE VALID )        9:
10:                                                                        10:
11:                                                                        11:
12:                                                                        12:
13:                                                                        13:
14:                                                                        14:
15:                                                              --> JRB   15:

SCREEN    00102    0066

0: ( AIRLINES SCANNER        SPRITE PICKUP               08-26-80) HEX     0:
 1:                                                                         1:
 2:   : CHKPT SPR.NAME SPRTA ! 0         ( GET TO TOP OF TABLE @ = ERR )    2:
 3:           20 0 DO                    ( 32 MAXIMUM SPRITES         )     3:
 4:             XCOMP                                                       4:
 5:             IF YCOMP                                                    5:
 6:                IF DROP I 1+ PLINK LEAVE ENDIF   ( WHEN FOUND )          6:
 7:             ENDIF                               ( BLINK POSI )          7:
 8:           SPRTA @  4  + SPRTA !               ( GET TO NEXT SPRTE )     8:
 9:           SPRTA @ P@ 0= IF   LEAVE ENDIF ( 0 IS DELIMITER      )        9:
10:           LOOP ;                            ( 0 LEFT IF NO COMPARE )   10:
11:                                                                        11:
12:                                                                        12:
13:                                                                        13:
14:                                                                        14:
15:                                                              --> JRB   15:

SCREEN    00103    0067

0: ( AIRLINES SCANNER        SCAN EXEC                   08-26-80) HEX     0:
 1:                                                                         1:
 2:  : SCANNER C0 FF TIMESET URSET 0                                        2:
 3:     BEGIN DROP 0 TIMEOUT IF 1 ELSE CIP         ( GET TIMEOUT STAT )     3:
 4:       IF 0  ELSE 1 ENDIF   ENDIF               ( CARD IN PLACE    )     4:
 5:     URDATA                                                              5:
 6:     IF  7F =                                   ( GET UPART STAT  )      6:
 7:        IF ,DROP 3 0 DO BEGIN URDATA END        ( IF URT DROP TIME )     7:
 8:                       LOOP                     ( GET DATA 3 BYTES )     8:
 9:                 DROP YBIAS XBIAS CHKPT DUP     ( DROP CLOSE- BIAS )     9:
10:        ENDIF                                   ( TO SCREEN LOCATI )    10:
11:     ENDIF                                      ( CHK FOR LEGAL PT )    11:
12:     END       ;                                ( END CHKS FOR EXIT)    12:
13:                                 ( TIMEOUT CONTAINS A CHK FOR CARD )    13:
14:                                 ( IN PLACE FOR EXIT ALSO          )    14:
15:                                                              --> JRB   15:

SCREEN    00104    0068

0: ( AIRLINES SCANNER        SCAN EXEC                   08-20-80) HEX     0:
 1:                 :V DAY                                                  1:
 2:   : ADDNUM    ,DUP P@ + SWAP 20 + B! ,DUP 30 + SWAP B!                  2:
 3:              C@@ FAT.NAME 300 UPDATE DAY @ 0A * + DAY ! 1+  ;           3:
 4:   : GETKEY   SCANNER DUP 0=                                             4:
 5:              IF DROP TRUE FALSE 0 DAY !                                 5:
 6:              ELSE DUP A =                                               6:
 7:                IF DROP TRUE FALSE                                       7:
 8:                ELSE DUP C =                                             8:
 9:                   IF DROP FALSE FALSE                                   9:
10:                   ELSE  DUP B = IF DROP 0 ENDIF TRUE                   10:
11:                   ENDIF                                                11:
```

```
12:                ENDIF                                                   12:
13:                ENDIF ;                                                 13:
14:  : BLKNUM    2020 OVER ! A0A0 OVER 20 + ! C@@ PAT.NAME 300              14:
15:              UPDATE ;                                    --> JEF       15:
SCREEN   00105   0069

0: ( AIRLINES SCANNER     SCAN EXEC           08-20-80) HEX                0:
 1:                                                                         1:
 2: : GETDAY    BEGIN 0 DAY ! PAT.NAME 93 + BLKNUM GETKEY                   2:
 3:                IF ADDNUM GETKEY                                         3:
 4:                   IF ADDNUM GETKEY DROP                                 4:
 5:                   ENDIF                                                 5:
 6:                ENDIF SWAP DROP DAY @ 1F >                               6:
 7:                IF DROP FALSE ENDIF                                      7:
 8:             END DAY @ ;                                                 8:
 9:                                                                         9:
10:   ( GETDAY              --- N1                )                        10:
11:             ( GETS DAY OFF TEN KEY PAD )                                11:
12:             ( N1 IS DAY ENTERED.       )             --> JEF           12:
13:                                                                        13:
14:                                                                        14:
15:                                                                        15:
SCREEN   00106   006A

0: ( AIRLINES SCANNER     SECOND-WAIT , CARD-WAIT  09-11-80) HEX           0:
 1:                                                                         1:
 2: : SECOND-WAIT   0 DO 500 0                                              2:
 3:                   DO CIP IF LEAVE ENDIF ESC LOOP                        3:
 4:                CIP IF LEAVE ENDIF LOOP ;                                4:
 5:                                                                         5:
 6: : CARD-WAIT BEGIN ESC CIP ENDF ;                                        6:
 7:                                                                         7:
 8: : PICK-CITY HEIGHT 1 DO I CITY @ 1- > IF SWAP ENDIF DROP LOOP           8:
 9:             CITY ! ;                                                    9:
10:                                                                        10:
11: : STRING"   HERE 6 + LIT CALL, , C9 B,                                 11:
12:             22 WCRD DP @ B@ 1+ DP +! ;                                 12:
13:             IMPERATIVE                         DECIMAL   ;S JEF        13:
14:                                                                        14:
15:                                                                        15:
SCREEN   00107   006B

0: ( AIRLINES PRINTER     PRINTER FORMATTER       08-20-80) HEX            0:
 1:                                                                         1:
 2: ( TAKES A RESERVATION SCREEN, REFORMATS THE DATA, AND PLACES)           2:
 3: ( IT INTO THE PRINTER BUFFER AT ADDR HEX 3000-33FF. PRINTER )           3:
 4: ( DRIVER THEN PRINTS BUFFER CONTENTS ON TICKET.             )           4:
 5:                                                                         5:
 6: ( VARIABLES & CONSTANTS  USED ARE:                          )           6:
 7:                                                                         7:
 8:  :V SPTR    ( SOURCE POINTER TO RESERVATION SCREEN )                    8:
 9:  :V DPTR    ( DESTINATION POINTER TO PRINTER BUFFER)                    9:
10:  :V DLNST   ( POINTER TO START OF CURRENT LINE IN  )                   10:
11:             ( PRINT BUFFER                         )                   11:
12:  :V STOP    ( CONTAINS 'STOP SEARCH' CHAR IN 'MOVCHR' WORD)            12:
13:                                                                        13:
14:                                                                        14:
15:                                                  --> GPK               15:
SCREEN   00108   006C

0: ( AIRLINES PRINTER     PRINTER FORMATTER       08-20-80) HEX            0:
 1: ( UTILITY WORDS USED ARE:                                 )             1:
 2: ( STORE CHAR ON TOS AT ADDR CONTAINED IN 'DPTR', INC 'DPTR' )           2:
 3: : PBUFF! DPTR @ B! 1 DPTR +! ; ( "PRINT BUFFER STORE")                 3:
 4:                                                                         4:
 5: ( MOVE CHAR DATA FROM SOURCE TO DESTINATION TILL 'STOP CHAR')           5:
```

```
 6: ( MATCHED, THEN INC SOURCE & DESTINATION PTRS. MOVES MAX 32 CH)    6:
 7: : MOVCHR STOP P! ( SAVE STOP CHAR)                                  7:
 8: 20 0 DO SPTR @ B@ DUP STOP B@ = IF DROP LEAVE ( IF STOP CHAR )      8:
 9: ELSE PBUFF! 1 SPTR +! ENDIF LOOP ;                                  9:
10:                                                                    10:
11: : CRLNF 0D PBUFF! 0A PBUFF! ; ( STORE CARRIAGE RET & LN FEED)     11:
12:                                                                    12:
13: ( INDEX TO NEXT FIELD IN ITINERARY LEG PORTION OF PNR)             13:
14: : INDEXFLD DLNST @ + DPTR ! 2F MOVCHR 1 SPTR +! ; ( SKP / DELM)    14:
15:                                                             --> GPK 15:
```

SCREEN    00109    006D

```
 0: ( AIRLINES PRINTER      PRINTER FORMATTER       08-21-80) HEX     0:
 1:                                                                    1:
 2: ( FIND NEXT / IN SOURCE FIELD, UPDATE SOURCE PTR TO 1 PAST /)       2:
 3: ( SEARCHES MAX OF 32 CHARACTERS.                           )       3:
 4: : FIND/ 20 0 DO SPTR @ B@ 2F = IF 1 SPTR +! LEAVE ELSE 1 SPTR      4:
 5:        +! ENDIF LOOP ;                                              5:
 6:                                                                    6:
 7:                                                                    7:
 8: ( FILL BUFFER WITH "SPACE" CHARACTERS)                             8:
 9: : CLRBUF 400 0 DO PBUF I + 20 SWAP B! LOOP ;                       9:
10:                                                                   10:
11:                                                                   11:
12:                                                                   12:
13:                                                                   13:
14:                                                                   14:
15:                                                            --> GPK 15:
```

SCREEN    00110    006E

```
 0: ( AIRLINES PRINTER      PRINTER FORMATTER       08-21-80) HEX     0:
 1: : PRFMT CLRBUF ( PUT "SPACE" CHAR IN BUFFER)                       1:
 2:   PBUF DPTR !       ( PRINT BUFFER STARTS AT 3000 HEX )            2:
 3:   2 PBUFF! 9 GETFLD SPTR ! ( POINT TO 'ORIGIN')                    3:
 4:   27 DPTR +! ( SKIP 39 SPACES ON TKT) 2F MOVCHR ( XFER ORIGIN)     4:
 5:   CRLNF 27 DPTR +! ( 39 SPACES)                                    5:
 6:   0A GETFLD SPTR ! ( PTR TO 'DESTINATION') 2F MOVCHR CRLNF CRLNF   6:
 7:   1 GETFLD SPTR ! DPTR @ DLNST ! ( SAVE PTR,GETSURNAME) 2F MOVCHR  7:
 8:   2C PBUFF! 20 PBUFF! ( STORE COMMA SPACE) 1 SPTR +! ( SKIP /)     8:
 9:   2F MOVCHR ( GET 1ST NAME) 20 PBUFF! 1 SPTR +!                    9:
10:   2F MOVCHR ( GET MR/MS )  3 GETFLD SPTR !  ( POINT TO DATE FLD)  10:
11:   1D INDEXFLD ( GET DATE) CRLNF CRLNF CRLNF                       11:
12:   5 0 DO I 0B + GETFLD SPTR ! ( GET 4 ITINERARY LEGS)             12:
13:          SPTR @ B@ 20 =     ( IF LEG BLANK, & PREV LEG NON-BLANK, ) 13:
14:   IF              ( THEN JUST PRINT 'DESTINATION' FLD OF PREV LEG) 14:
15:   I 0A + GETFLD DUP B@ 20 = IF DROP ELSE SPTR ! FIND/   --> GPK  15:
```

SCREEN    00111    006F

```
 0: ( AIRLINES PRINTER      PRINTER FORMATTER       08-20-80)          0:
 1:                                                                    1:
 2: ( PRINT DEST. FIELD FROM PREV LEG, WHICH IS FINAL DEST.)            2:
 3:                                                                    3:
 4:   DPTR @ DLNST ! ( UPDATE LINE START PTR.)                         4:
 5:                                                                    5:
 6:   2 INDEXFLD ( XFER DESTINATION DATA FOR THIS LEG )                6:
 7:                                                                    7:
 8:   ENDIF                                                            8:
 9:                                                                    9:
10:                                                                   10:
11:                                                                   11:
12:                                                                   12:
13:                                                                   13:
14:                                                            --> GPK 14:
15:                                                                   15:
```

SCREEN    00112    0070

```
 0: ( AIRLINES PRINTER      PRINTER FORMATTER         08-20-80)
 1:
 2:   ELSE DPTR @ DLNST !  ( SAVE PTR TO START OF LINE)
 3:       ( GET "FROM")    2 INDEXFLD
 4:       ( FIND FLT # FIELD IN SOURCE )    FIND/
 5:       ( GET CARRIER)  13 INDEXFLD
 6:       ( GET FLT #)    17 INDEXFLD
 7:       ( GET CLASS)    1B INDEXFLD
 8:       ( GET DATE)     1D INDEXFLD
 9:       ( GET TIME)     25 INDEXFLD
10:   ENDIF CRLNF
11:   LOOP
12:
13: ( POINT TO FARE FL )  8 GETFLD SPTR !
14: ( GET FARE) 2F MOVCHR 4 0 DO CRLNF LOOP
15:                                                         --> GPK
```

SCREEN    00113    0071

```
 0: ( AIRLINES PRINTER      PRINTER FORMATTER         08-20-80)
 1:
 2: ( GET TOTAL)    8 GETFLD SPTR ! 2F MOVCHR
 3: ( ADVANCE FORM) 9 0 DC CRLNF LOOP
 4: ( STORE ETX)    3 PBUFF! ;
 5:
 6:
 7:
 8:
 9:
10:
11:
12:
13:
14:
15:                                                         --> GPK
```

SCREEN    00114    0072

```
 0: ( AIRLINES PRINTER      DRIVER PORT               08-27-80) HEX
 1:
 2: : PSTAT      P@ 2C NOT 0FF AND ;         ( 8741 STATUS          )
 3: : POUT       PBUFPTR @ DUP              ( GET PTR INX AND STR  )
 4:              B@ NOT P! 2C 1+ PBUFPTR !  ( GET BYTE AT POINTER  )
 5:              PSTAT  0= IF ELSE DROP     ( AND OUTPUT TO 8741   )
 6:                 6 ENDIF ;
 7: : OKEXIT     IF PSTAT 0F AND 1+         ( ERROR GET TYPE FROM PTR )
 8:              ELSE 3F FF TIMESET         ( RESET TIMER          )
 9:                 BEGIN PSTAT DUP 80 =    ( STAT = C0    FOR RDY )
10:              IF DROP 0 1 ELSE F0 AND DUP 60 =  ( CHECK FOR TIMEOUT )
11:              IF DROP 5 1 ELSE C0 = IF 0 1 ELSE TIMEOUT IF 6 1 ELSE
12:              0 ENDIF ENDIF ENDIF ENDIF
13:              END ENDIF ;    ( 0 = OK      3= PRINTER   6= TIMEOUT )
14:                             ( 1 = ROM ERR 4= CUTTER )
15:                             ( 2 = RAM ERR 5= JAM )         --> JRB
```

SCREEN    00115    0073

```
 0: ( AIRLINES PRINTER      DRIVER                    08-20-80) HEX
 1:
 2: : PRINTER PRFMT      ( FORMAT RESV. SCREEN INTO PRINT BUFF)
 3:           PBUF PBUFPTR !          ( SET BUFFER TO TOP )
 4:
 5:    FF FF TIMESET
 6:    BEGIN       PSTAT DUP 80 =     ( CHECK PTR READY    )
 7:      IF DROP 0 POUT               ( OUTPUT TO 8741     )
```

```
                    41                                                              42
 8:         ELSE DUP 25 =                       ( CHK FOR BUSY          )        8:
 9:           IF DROP 0                                                          9:
10:             ELSE 02 AND                     ( CHK FOR ERRORS        )       10:
11:           ENDIF                                                             11:
12:         ENDIF                                                               12:
13:                                                                             13:
14: ( SHUD COME OUT WITH 0 ON STACK ELSE IN ERROR MODE )                        14:
15:                                                                    --> JRB  15:

SCREEN   00116   0074

0: ( AIRLINES PRINTER     DRIVER                    08-20-80)                   0:
 1:                                      ( 1 ON STACK MEANS ERROR       )        1:
 2:        IF 1 1                        ( IF 1 SET STK FOR 1 ON EXIT   )        2:
 3:          ELSE PBUFPTR @ 1 - B@ 03 =  ( CHK BYTE FOR ETX             )        3:
 4:            IF 0 1                    ( 0 SET ON STACK FOR EXIT      )        4:
 5:            ELSE TIMEOUT                                                      5:
 6:              IF 2 1    ( SET UP FOR ERROR XIT                      )         6:
 7:              ELSE 0  ( SET STACK UP FOR NO EXIT                    )         7:
 8:              ENDIF                                                           8:
 9:            ENDIF                                                             9:
10:          ENDIF                        ( END CHKS STK AND IF 1 EXITS )       10:
11:        END                            ( WITH NEXT STK ENTRY         )       11:
12:                                       ( CHK 8741 FOR ERROR PROBLEMS )       12:
13:        OKEXIT         ;               ( 1 ON EXIT = ERROR , 0 = OK  )       13:
14:                                                                    --> JRB  14:
15:                                                                             15:

SCREEN   00117   0075

0: ( AIRLINES ITINERARY   ITINRY                    09-11-80) HEX               0:
 1:   ( TAKES ITINERARY INFO IN RESERVATION SCRN, AND PUTS IN PRINT )            1:
 2:   ( BUFF REFORMATTED FOR DISPLAY TO PATRON. EXITS WITH ADDRESSES)            2:
 3:   ( ON STACK THAT ARE REQUIRED BY "FOILER" WORD.                )            3:
 4:                                                                              4:
 5:                         ( "FROM" )                                           5:
 6: : ITINRY  PNR-NAME CLRBUF ( CLR BUF) 20 PBUF B! ( LENGTH BYTE)                6:
 7:   PBUF 1 + DPTR ! 3A 4D 46 3 0 DO PBUFF! LOOP ( STORE "FM: ")                 7:
 8:   1 DPTR +! ( INC DEST. PTR) 9 GETFLD SPTR ! ( SRC PTR)                       8:
 9:   2F MOVCHR ( XFER "ORIGIN)                                                   9:
10:                          ( "TO" )                                           10:
11:   ( PRESET LENGTH BYTE = 1 FOR LEGS 2,3, & 4)                               11:
12:   PBUF 20 + 3 0 DO 20 + DUP 1 SWAP B! LOOP DROP  4  0                       12:
13:   DO  ( DISPLAY EACH LEG OF ITINERARY, 4 LEGS MAX. )                        13:
14:     I 0B + GETFLD   ADDR. OF LEG) DUP B@ 20 =              --> GPK          14:
15:                                                                             15:

SCREEN   00118   0076

0: ( AIRLINES ITINERARY   ITINRY                    09-11-80) HEX               0:
 1:   IF DROP LEAVE ( IF LEG BLANK, THEN FINISHED)                               1:
 2:     ELSE SPTR ! ( SAVE SRC ADDR)                                             2:
 3:     PBUF I 1 + @ DO 20 + LOOP ( COMPUTE ADDR OF NEXT LEN.BYTE)               3:
 4:     DUP 20 SWAP ! ( LEN=32) 1 + DUP DPTR ! ( DEST. PTR)                      4:
 5:     DLNST ! ( START OF LINE PTR)                                             5:
 6:     3A 4F 54 3 0 DO PBUFF! LOOP ( STORE "TO: ")                              6:
 7:     FIND/ ( INDEX TO LEG DEST.) 4 INDEXFLD ( XFER "DEST")                    7:
 8:     13 INDEXFLD ( XFER "CARRIER") 15 INDEXFLD ( XFER "FLT #")                8:
 9:     DLNST @ 1A + DPTR ! ( PTR TO "CLASS" FLD)                                9:
10:     SPTR @ B@ 59 = IF ( 59=Y="COACH") 48 43 41 4F 43                        10:
11:                    ELSE ( "FIRST" )  54 53 52 49 46  ENDIF                  11:
12:     5 0 DO PBUFF! LOOP ( STORE "CLASS")                                     12:
13:   ENDIF ( ADDRESSES ON STACK FOR CALL TO FOILER)                            13:
14:   LOOP PBUF 80 + PBUF 60 + PBUF 40 + PBUF 20 + PBUF DYNNAME ;               14:
15:                                                                    --> GPK  15:
```

```
SCREEN    00119   0077
 0: ( AIRLINES RESERVA ION   MAKE-RES                     09-16-80) DCM
 1:  ( MAKES SCRN 220  NTO RESV., BASED ON PATRON CITY SELECTION)
 2:  : MAKE-RES 220 SCRN ! ( XFER SURNAME) NAM1PTR @ SPTR ! 1 GETFLD
 3:   DPTR ! 30 0 DO SPTR @ B@ DUP 47 = IF DROP LEAVE ELSE DUP 94 =
 4:   ( CARAT) IF DROP LEAVE ELSE PBUFF! 1 SPTR +! ENDIF ENDIF LOOP
 5:   ( XFER 1ST INIT.,TITLE="  /") 47 32 32 47 SPTR @ 1 + P@ 47
 6:   6 0 DO PBUFF! LOOP ( XFER FINAL DEST.) CITY @ 1 + SPTR ! 10
 7:   GETFLD DPTR ! 32  OVCHR 1 SPTR +! 32 PBUFF! 32 MOVCHR 47 PBUFF!
 8:   ( XFER INIT.FLT # & CARRIER) CITY @ 21 + SPTR ! 2 GETFLD DPTR !
 9:   32 MOVCHR 47 PBUFF!              11 GETFLD 10 + DPTR ! ( SKP SD)
10:   CITY @ 1 + SPTR ! 32 MOVCER SPTR @ 1 + P@ 32 = NOT IF 32 PBUFF!
11:   1 SPTR +! 32 MOVCHR ( XFER 2ND PART OF DEST.) ENDIF 47 PBUFF!
12:   ( XFER CARRIER) CITY @ 21 + DUP P@ PBUFF! 1 + B@ PBUFF!
13:   47 PBUFF! ( XFER FLT #) CITY @ 23 + SPTR ! 32 MOVCHR 47 PBUFF!
14:   ( "COACH") 89 PBUFF! ( XFER "/15SEP80/1430/") 47 48 51 52 49 47
15:   48 56 80 69 83 53 49 47 14 0 DO PBUFF! LOOP           --> GPK
SCREEN    00120   0078
 0: ( AIRLINES RESERVA ION   MAKE-RES                     09-15-80)
 1:
 2:  ( XFER FARE) CITY @ 37 + SPTR ! 8 GETFLD DPTR ! 32 MOVCHR
 3:   47 PBUFF! PREV @  AM2PTR ! ;
 4:
 5:
 6:
 7:
 8:
 9:
10:
11:
12:
13:
14:
15:                                                DECIMAL ;S GPK
SCREEN    00121   0079
 0: ( AIRLINES          LOADER, START, BORDER    08-20-80) HEX
 1:
 2:  : LOADER    HERE ' VSTART 3 + !
 3:             STATES 0 DO I COMPILE LOOP ;
 4:
 5:  : START    LOAD.SET INIT PRESCALE ;
 6:
 7:  : BORDER   07 SWAP LD.VREG.R ;                DECIMAL  ;S   JHF
 8:
 9:
10:
11:
12:
13:
14:
15:
SCREEN    00122   007A
```

SCREEN    00123    007B
    0:    0:
    1:    1:
    2:    2:
    3:    3:
    4:    4:
    5:    5:
    6:    6:
    7:    7:
    8:    8:
    9:    9:
   10:   10:
   11:   11:
   12:   12:
   13:   13:
   14:   14:
   15:   15:
SCREEN    00124    007C
    0:    0:
    1:    1:
    2:    2:
    3:    3:
    4:    4:
    5:    5:
    6:    6:
    7:    7:
    8:    8:
    9:    9:
   10:   10:
   11:   11:
   12:   12:
   13:   13:
   14:   14:
   15:   15:
SCREEN    00125    007D
    0:    0:
    1:    1:
    2:    2:
    3:    3:
    4:    4:
    5:    5:
    6:    6:
    7:    7:
    8:    8:
    9:    9:
   10:   10:
   11:   11:
   12:   12:
   13:   13:
   14:   14:
   15:   15:
SCREEN    00126    007E
    0:    0:
    1:    1:
    2:    2:
    3:    3:
    4:    4:
    5:    5:
    6:    6:
    7:    7:
    8:    8:
    9:    9:
   10:   10:
   11:   11:

```
12:   12:
13:   13:
14:   14:
15:   15:
SCREEN    00127    007F

0:    0:
 1:    1:
 2:    2:
 3:    3:
 4:    4:
 5:    5:
 6:    6:
 7:    7:
 ):    8:
 9:    9:
10:   10:
11:   11:
12:   12:
13:   13:
14:   14:
15:   15:
SCREEN    00128    0080

0:    0:
 1:    1:
 2:    2:
 3:    3:
 4:    4:
 5:    5:
 6:    6:
 7:    7:
 8:    8:
 9:    9:
10:   10:
11:   11:
12:   12:
 3:   13:
 .:   14:
15:   15:
SCREEN    00129    0081

0:    0:
 .:    1:
 .:    2:
 3:    3:
 4:    4:
 5:    5:
 6:    6:
 7:    7:
 8:    8:
 9:    9:
10:   10:
11:   11:
12:   12:
13:   13:
14:   14:
15:   15:
SCREEN    00130    0082

0:    0:
 1:    1:
 2:    2:
 3:    3:
 4:    4:
 5:    5:
 6:    6:
```

```
 :   7:
 8:  8:
 9:  9:
10: 10:
11: 11:
12: 12:
13: 13:
14: 14:
15: 15:

SCREEN    00131    0083

0:  0:
 1:  1:
 2:  2:
 3:  3:
 4:  4:
 5:  5:
 6:  6:
 7:  7:
 8:  8:
 9:  9:
10: 10:
11: 11:
 :  12:
 :  13:
14: 14:
15: 15:

SCREEN    00132    0084

0:  0:
 1:  1:
 :   2:
 :   3:
 4:  4:
 5:  5:
 6:  6:
 7:  7:
 8:  8:
 9:  9:
10: 10:
11: 11:
12: 12:
13: 13:
14: 14:
15: 15:

SCREEN    00133    0085

0:  0:
 1:  1:
 2:  2:
 3:  3:
 4:  4:
 5:  5:
 6:  6:
 7:  7:
 :   8:
 :   9:
10: 10:
11: 11:
12: 12:
13: 13:
14: 14:
15: 15:
```

```
SCREEN    00134    0086

0:    0:
 1:    1:
 2:    2:
 3:    3:
 4:    4:
 5:    5:
 6:    6:
 7:    7:
 8:    8:
 9:    9:
10:   10:
11:   11:
12:   12:
 `:   13:
  :   14:
15:   15:

SCREEN    00135    0087

0: ( AIRLINES PNR          SRCHNM                  08-20-80)        0:
  :                                                                  1:
  : ( SEARCH NAME 'SRCHNM' DOCUMENTATION                        )    2:
 3: ( ENTRY: BUFFER ADDR. CN STACK, BUFFER CONTAINS PASSENGER NAME ) 3:
 4: (        TO SEARCH FOR, TERMINATED WITH SLASH CHAR. = 47 DEC.  ) 4:
 5: (        IF SURNAME > 10 CHAR, ONLY 1ST 10 CHAR SEARCHED FOR.  ) 5:
 6: ( EXIT:  IF SURNAME FOUND, RESERVATION FILE # PLACED ON        ) 6:
 7: (        STACK, RANGE 1 - 10. IF SURNAME NOT FOUND, 0 ON STK.  ) 7:
 8:                                                                  8:
 9: ( :V NAM1PTR   POINTER TO NAME BUFFER IN MEMORY, SEARCH TARGET ) 9:
10:   :V NAM2PTR ( POINTER TO NAME FIELD OF CURRENTLY EXAMINED SCR.) 10:
11:   :V SCRN    ( SCREEN NUMBER CONTAINING MATCHING SURNAME)        11:
12:             ( SCREENS IN RANGE OF 210 TO 219)                    12:
13:             ( SET TO ZERO IF SURNAME NOT FOUND)                  13:
14:                                                                  14:
15:                                                          --> GPK 15:

SCREEN    00136    0088

0: ( AIRLINES PNR          SRCHNM                  08-20-80)        0:
 1:                                                                  1:
 2:   : SRCHNM                                                       2:
 3:   ( NAM1PTR = ADDR. OF TARGET NAME) 0 SCRN ! ( INIT FLAG)        3:
 4:   220 210 DO I BLOC NAM2PTR ! ( SAVE ADDR. OF PNR NAME FIELD)    4:
 5:   10 0 DO NAM2PTR @ I + B@ ( GET NEXT CHAR OF 10 CHAR PNR NAME)  5:
 6:   NAM1PTR @ I + B@ ( GET NEXT CHAR OF TARGET NAME)               6:
 7:   DUP 47 = IF J SCRN ! LEAVE ( IF SLASH FOUND, SET SCRN & EXIT)  7:
 8:            ENDIF ( OTHERWISE, CHECK NEXT CHAR.)                  8:
 9:   = IF ( ALL 10 CHAR. MATCH?) I 9 = IF J SCRN ! LEAVE ENDIF      9:
10:        ELSE LEAVE ( NO MATCH, CHECK NEXT SCREEN)                 10:
11:        ENDIF LOOP ( CHAR. SEARCH LOOP)                           11:
12:   SCRN @ 0= IF ELSE LEAVE ENDIF  ( EXIT IF MATCH FOUND)          12:
13:   LOOP ( SCREEN SEARCH LOOP)                                     13:
14:   SCRN @ DUP 0= IF ELSE 209 - ( RESERV. FILE #, 1-10, ON STACK)  14:
15:                 ENDIF ;                                  --> GPK 15:

SCREEN    00137    0089

0: ( AIRLINES PNR          GETFLD                  08-20-80)        0:
 1: ( 'GETFLD' CODE, P1 = DATA FIELD # 1-17 )                        1:
 2: :V FLDADR ( ADDR OF REQUESTED FLD IN FORTH RESERVATION SCREEN)   2:
 3: : GETFLD                                                         3:
 4: SCRN @ BLOCK FLDADR ! ( SAVE SCR ADDR.) 1 - ( P1 = 0 TO 16 NOW)  4:
 5: ( COMPUTE ADDR OF REQUESTED FIELD, FOR P1 = 0 - 9, INDEX = 32)   5:
 6: ( P1 = 10- 16, INDEX TO NEXT FIELD IS 64 )                       6:
 7: 17 0 DO DUP 0= IF ( IF P1=0) LEAVE                               7:
 8:                ELSE 1 - FLDADR @ I  9 = IF 64 +    ENDIF         8:
 9:                                     I 10 < IF 32 +               9:
10:                ( INDEXING POINTER HERE) ELSE 64 +                10:
11:                ( TILL P1 DEC. TO 0)      ENDIF                   11:
```

```
             FLDADR !
                    ENDIF
14:    LOOP
15:    DROP FLDADR @ ;  ( PUT ADDR. OF REQ. FIELD ON STACK)  --> GPK
SCREEN    00138    009A

0: ( AIRLINES PNR          CARD-NAME                09-18-80) HEX
1:   1FA0         :C DYNNAME         ( DYNAMIC NAME BUFFER )
2:   : NAME-CARD     NAM1PTR @ PNTR ! FALSE 25 0
3:   ( FIND "/" )    DO DROP BUF@ DUP 2F =
4:                       IF LEAVE DROP TRUE
5:                       ELSE 5E = IF LEAVE ENDIF FALSE ENDIF LOOP
6:                   IF PNTR @ DUP 1+
7:   ( FIRST NAME )      BEGIN 1+ DUP B@ DUP 2@ = SWAP 5E = OR END
8:                       DUP NAM1PTR @ - 2+ DYNNAME F!
9:   ( AND LENGTH )      SWAP - DYNNAME 1+ PNTR @ 3 PICK MOVE
10:  ( FN " SN )         DYNNAME 1+ + 20 OVER B!
11:                  ELSE PNTR @ NAM1PTR @ - 1+ DYNNAME F!
12:                       DYNNAME ENDIF 1+ NAM1PTR @
13:  ( SIR NAME )    PNTR @ OVER - 1- MOVE DYNNAME DUP B@
14:                  OVER + 1- 3F20 SWAP ! ;              --> JHF
15:
SCREEN    00139    008B

0: ( AIRLINES PNR          PNR-NAME                 09-11-80) HEX
1:
2:   :V DPNTR
3:
4:   : PNR-NAME NAM2PTR @ DUP PNTR ! 3 0
5:   ( GET 3 )     DO
6:   ( NAMES. )        BEGIN BUF@ 2F =
7:                     END PNTR @
8:   ( ADD    )    LOOP DUP NAM2PTR @ - DYNNAME B!
9:   ( LENGTH.)    DYNNAME 1+ DPNTR ! 3 0
10:  ( MOVE 3 )    DO  DPNTR @ 3 PICK 3 PICK OVER - DUP DPNTR +! 1-
11:  ( NAMES. )        MOVE 20 DPNTR @ 1- B! DROP
12:                LOOP DROP ;
13:
14:
15:                                            DECIMAL ;S   JHF
SCREEN    00140    008C
```

SCREEN    00141    008D

```
 8:                                                                                           8:
 9:                                                                                           9:
10:                                                                                          10:
11:                                                                                          11:
12:                                                                                          12:
13:                                                                                          13:
14:                                                                                          14:
15:                                                                                          15:

SCREEN    00142    008E

0:   0:
 1:   1:
 2:   2:
 3:   3:
 4:   4:
 5:   5:
 6:   6:
  :   7:
 8:   8:
 9:   9:
10:  10:
11:  11:
12:  12:
13:  13:
14:  14:
15:  15:

SCREEN    00143    008F

0:   0:
 1:   1:
 2:   2:
 3:   3:
 4:   4:
 5:   5:
 6:   6:
 7:   7:
 8:   8:
 9:   9:
10:  10:
11:  11:
  :  12:
  :  13:
14:  14:
15:  15:

SCREEN    00144    0090

0: ( AIRLINES ANIMATION    ROLLING EYES              08-29-80) HEX        0:
 1:                                                                        1:
 2:                                                                        2:
  : :V ROLLS  4 ROLLS !  :V DELAY  400 DELAY !                             3:
 4:                                                                        4:
 5: : MOVE-EYE 4 * 2F82 B! F80 2F60 80 UPDATE DELAY @ ? DO LOOP ;           5:
 6:                                                                        6:
 7: : EYES      2C10 2F80 !  BLACK 2F83 B!                                  7:
 8:             0 2C86 B! 80 2CA6 B! 0 2C88 B! 80 2CA8 B!                   8:
 9:             C00 2C00 300 UPDATE ROLLS @ 0                                9:
10:             DO 4 0                                                     10:
11:                DO I 18 + MOVE-EYE LOOP 4 0                             11:
12:                DO 1B I - MOVE-EYE LOOP                                 12:
13:             LOOP ;                                             --> JHF 13:
14:                                                                        14:
15:                                                                        15:
```

```
SCREEN    00145    0091

0: ( AIRLINES ANIMATION    727 TOUCH 'N GOES        09-09-90) HEX
 1: :V 1DELAY       10 1DELAY !     :V 727CLR    02 727CLR !
 2: : CLRLEFT       727CLR @ DUP 10 = IF DROP 02 DUP 727CLR ! ENDIF
 3:                 80 OR DUP 2F9F B! 2F9B B! 01 727CLR +! ;
 4: : TIME          1DELAY @ 0 DO LOOP ;
 5:
 6: : UPSPRITE      F80 2F80 80 UPDATE ;
 7:
 8: : +MOVE-IT      DUP B@ 1+ SWAP B! ;
 9:
10: : -MOVE-IT      DUP B@ 1- SWAP B! ;
11:
12: : UP-TAIL       2F9C -MOVE-IT 2F9D DUP +MOVE-IT +MOVE-IT ;
13:
14: : FR-DOWN       2F98 +MOVE-IT 2F99 DUP +MOVE-IT +MOVE-IT ;
15:                                                          --> JHF

SCREEN    00146    0092

0: ( AIRLINES ANIMATION    727 TOUCH 'N GOES        09-09-90) HEX
 1: : FLY           0044 2F98 ! 5C 2F9A B!
 2:                 0054 2F9C ! 4C 2F9E B! CLRLEFT
 3:                 10 0 DO FR-DOWN  UPSPRITE TIME  TIME
 4:                     LOOP 00 2F99 B! 2F9B DUP B@ 7F AND SWAP B!
 5:                 10 0 DO FR-DOWN 2F9C +MOVE-IT 2F9D DUP +MOVE-IT
 6:                     +MOVE-IT UPSPRITE TIME  TIME
 7:                     LOOP 00 2F9D B! 2F9F DUP B@ 7F AND SWAP B!
 8:                 C0 0 DO 2F99 +MOVE-IT 2F9D +MOVE-IT UPSPRITE TIME
 9:                     LOOP
10:                 0F 0 DO UP-TAIL 2F98 -MOVE-IT 2F99 DUP +MOVE-IT
11:                     +MOVE-IT UPSPRITE TIME  TIME
12:                     LOOP 00 2F9F B!
13:                 10 0 DO UP-TAIL  UPSPRITE TIME  TIME
14:                     LOOP 00 2F9F B! UPSPRITE ;
15: : FLIGHTS  BEGIN FLY ESC ?IP END ;              DECIMAL ;S JHF

SCREEN    00147    0093

SCREEN    00148    0094
```

```
10:   10:
11:   11:
12:   12:
13:   13:
14:   14:
15:   15:

SCREEN    00149    0095

0:    0:
 1:    1:
 2:    2:
 3:    3:
 4:    4:
 5:    5:
 6:    6:
 7:    7:
 8:    8:
 9:    9:
10:   10:
11:   11:
  :   12:
  :   13:
14:   14:
15:   15:

SCREEN    00150    0096

0: ( AIRLINES EXECUTIVE    STRINGS                    09-15-80) FEX    0:
 1:                                                                     1:
 2:   : EXECUTIVE    ;                                                  2:
 3:                                                                     3:
 4:   : FORGET    IF SCRATCH ENDIF FORGET ;                             4:
 5:                                                                     5:
 6:   : OCT       STRING" OCTOBER" ;                                    6:
 7:   : SEP       STRING" SEPTEMBER" ;                                  7:
 8:                                                                     8:
 9:   : LAT       STRING" LAKE TAHOE        AA567    COACH $107 " ;     9:
10:   : LAV       STRING" LAS VEGAS         AA345    COACH $95  " ;    10:
11:   : REN       STRING" RENO              AA213    COACH $115 " ;    11:
12:   : FRN       STRING" SAN FRANCISCO     AA527    COACH $60  " ;    12:
13:   : LAX       STRING" LOS ANGELES       AA835    COACH $32  " ;    13:
14:                                                             --> JHF 14:
15:                                                                    15:

SCREEN    00151    0097

0: ( AIRLINES EXECUTIVE    CANCELED                   09-12-80) HFX    0:
 1:                                                                     1:
 2: : CANCELED                                                          2:
 3:         DRED FOREGROUND LRED BACKGROUND COLOR                       3:
 4:         6 POILER              ( TRANSACTION CANCELED         )      4:
 5:                                                                     5:
 6:         5 SECOND-WAIT         ( 5 SECONDS CR CARD INSERTED   )      6:
 7:         FALSE ;               ( START TRANSACTION OVER AGAIN )      7:
 8:                                                                     8:
 9:                                                                     9:
10:                                                                    10:
11:                                                                    11:
12:                                                                    12:
13:                                                                    13:
14:                                                                    14:
15:                                                             --> JHF 15:
```

```
SCREEN    00152    0098

0: ( AIRLINES EXECUTIVE    SEE-AGENT , CANT-FIND    09-11-80) HEX
 1:
 2: : SEE-AGENT
 3:         DRED FOREGROUND LRED BACKGROUND COLOR
 4:         0 BOILER              ( SEE AGENT )
 5:
 6:         CARD-WAIT             ( DISPLAY UNTIL CARD REMOVED )
 7:         FALSE ;               ( START TRANSACTION OVER AGAIN )
 8:
 9: : CANT-FIND
10:         DRED FOREGROUND LRED BACKGROUND COLOR
11:         C BOILER              ( SORRY, CAN'T FIND. SEE AGENT )
12:
13:         CARD-WAIT             ( DISPLAY UNTIL CARD REMOVED )
14:         FALSE ;               ( START TRANSACTION OVER AGAIN )
15:                                                           --> JHF

SCREEN    00153    0099

0: ( AIRLINES EXECUTIVE    PRINT-ERR , TAKE-TKT    09-11-80) HEX
 1:
 2: : PRINT-ERR
 3:         B BOILER              ( "PRINTER IS DOWN MOMENTARILY" )
 4:
 5:         CARD-WAIT             ( DISPLAY UNTIL CARD REMOVED )
 6:         D BOILER              ( "OUT OF SIVICE" )
 7:         5 SECOND-WAIT
 8:         FALSE ;               ( TERMINATE, PRINTER IS DOWN !! )
 9: : TAKE-TKT
10:         DGREEN FOREGROUND LGREEN BACKGROUND COLOR
11:         8 BOILER              ( "PLEASE TAKE YOUR TICKET" )
12:
13:         CARD-WAIT             ( WAIT FOR CARD TO BE REMOVED )
14:         FALSE ;               ( DON'T TERMINATE )
15:                                                           --> JHF

SCREEN    00154    009A

0: ( AIRLINES EXECUTIVE    PRINT-TKT , GET-SEAT    09-11-80) HEX
 1:
 2:
 3: : PRINT-TKT
 4:         7 BOILER              ( "WE ARE PRINTING YOUR TICKET" )
 5:         PRINTER               ( PRINT TICKET )
 6:         IF  PRINT-ERR         ( NON-ZERO = PRINTER ERROR )
 7:         ELSE TAKE-TKT         (     ZERO = TICKET GOOD )
 8:         THEN ;
 9:
10: : GET-SEAT
11:         A BOILER              ( "PLEASE SELECT YOUR SEAT" )
12:         SCANNER DROP          ( GET INPUT AND IGNORE )
13:         PRINT-TKT ;           ( PRINT TICKET )
14:
15:                                                           --> JHF

SCREEN    00155    009B

0: ( AIRLINES EXECUTIVE    FIND-RES                 09-11-80) HEX
 1:
 2: : YOUR-RES?
 3:         WHITE FOREGROUND BLACK BACKGROUND COLOR
 4:
 5:         ITINRY                ( GET ITINERARY ADDRESS FIELDS )
 6:         5 BOILER              ( IS THIS YOUR ITINERARY ? )
 7:         SCANNER               ( 0 = TIME OUT, 1 = YES , 2 = NO )
 8:
 9:         CASE[ CANCELED  GET-SEAT SEE-AGENT ]CASE
10:             (     0 = T.O.  1 = YES , 2 = NO )
11:
```

```
                        ;       (         -                          )        --> JHF
                                (       OR PRINT-TKT                 )
                                (       FOR NO BOARDING PASS         )

SCREEN    00156    009C

0: ( AIRLINES EXECUTIVE     TODAY? , GET-DATE         09-11-80) HEX
 1:
 2: : FIND-RES WHITE FOREGROUND DGREEN BACKGROUND COLOR
 3:
 4:              9 BOILER         ( LOOKING FOR YOUR RESERVATION  )
 5:              EYES             ( DISPLAY EYE ANIMATION         )
 6:              SRCHNM           ( SEARCH NAME FOR RESERVATIONS  )
 7:         IF   YOUR-RES?        ( IF    FOUND, YOUR-RES?        )
 8:         ELSE CANT-FIND        ( IF NOT FOUND, CANT-FIND       )
 9:         THEN ;
10:
11: : GET-DATE  E BOILER          ( PLEASE ENTER DAY OF DEPARTURE)
12:             GETDAY            ( GET ENTRY                    )
13:        IF   FIND-RES          (   VALID DATE  )
14:        ELSE SEE-AGENT         ( INVALID DATE  )
15:        THEN ;                                                --> JHF

SCREEN    00157    009D

0: ( AIRLINES EXECUTIVE   THIS-MO. NEXT-MO. TODAY? 09-11-80) HEX
 1:
 2: : THIS-MO.  SEP          ( "SEPTEMBER" MESSAGE    )
 3:             GET-DATE ;
 4:
 5: : NEXT-MO.  OCT          ( " OCTOBER" MESSAGE     )
 6:             GET-DATE ;
 7:
 8: : TODAY?
 9:             3 BOILER         ( "WHEN ARE YOU LEAVING?"   )
10:             SCANNER          ( GET ANSWER                )
11:
12:             CASE[ CANCELED  FIND-RES  THIS-MO.  NEXT-MO. ]CASE
13:             (                                                 )
14:             ( 0 = T.O , 1 = TODAY , 2 = THIS MO. 3 = NEXT MO. )
15:             ;                                           --> JHF

SCREEN    00158    009E

0: ( AIRLINES EXECUTIVE    CITY?     HAVE-RES?       09-11-80) HEX
 1:
 2: : CITY?
 3:             04 BOILER
 4:             SCANNER CITY !
 5:             LAT LAV REN FRN LAX PICK-CITY
 6:             MAKE-RES
 7:             YOUR-RES? ;
 8:
 9: : HAVE-RES?
10:             10 BOILER
11:             SCANNER
12:             CASE[ SEE-AGENT TODAY? CITY? ]CASE ;         --> JHF
13:
14:
15:

SCREEN    00159    009F

0: ( AIRLINES EXECUTIVE    THIS-NAME                 09-11-80) HEX
 1:
```

```
 : : THIS-NAME
 3:              WHITE FOREGROUND BLACK BACKGROUND COLOR
 4:
 5:              NAME-CARD        ( GET CARD NAME                    )
 6:              2 BOILER         ( RESERVATIONS UNDER THIS NAME?    )
 7:              SCANNER          ( WAIT FOR ANSWER                  )
 8:
 9:              CASE[ CANCELED  HAVE-RES? SEE-AGENT  ]CASE
10:              (                                                  )
11:              (      0 = TIME OUT , 1 = YES , 2 = NO             )
12:          ;   (                                                  )    --> JHF
13:              (                 OR TODAY?                        )
14:              (          FOR NO BOOKING CAPACITY                 )
15:
```

SCREEN   00160   00A0

```
 0: ( AIRLINES EXECUTIVE     GET-CARD . FXEC          09-11-80) HEX
 1:
 2: : GET-CARD   TAPE @           ( EXTERNAL VIDEO?                  )
 3:         IF  VON              ( YES, TURN IT ON                   )
 4:             BEGIN CIP        (      CARD IN PLACE ?              )
 5:             END VOFF         (     YES, TURN IT OFF              )
 6:         THEN
 7:             WHITE FOREGROUND BLACK BACKGROUND COLOR CYAN BORDER
 8:             1 BOILER         ( "PLEASE INSERT YOUR CREDIT CARD"  )
 9:             FLIGHTS          ( DISPLAY 727 TOUCH 'N GOES         )
10:             CREDIT-CARD
11:         IF  SEE-AGENT
12:         ELSE THIS-NAME
13:         THEN ;
14: : EXEC      BEGIN GET-CARD END ;   ( HALTS ON HARDWARE FAILURE )
15:                                                 DECIMAL ;S  JHF
```

SCREEN   00161   00A1

SCREEN   00162   00A2

```
10:
11:
12:
13:
14:
15:

SCREEN   00163   00A3

0:
 1:
 2:
 3:
 4:
 5:
 6:
 7:
 8:
 9:
10:
11:
12:
13:
14:
15:

SCREEN   00164   00A4

0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:

SCREEN   00165   00A5

0:   0:
 1:   1:
 2:   2:
 3:   3:
 4:   4:
 5:   5:
 6:   6:
 7:   7:
 8:   8:
 9:   9:
10:  10:
11:  11:
12:  12:
13:  13:
14:  14:
15:  15:
```

```
10:
11:
12:
13:
14:
15:

0:
 1:
 2:
 3:
 4:
 5:
 6:
 7:
 8:
 9:
10:
11:
12:
13:
14:
15:
```

SCREEN    00166    00A6

```
 0:   0:
 1:   1:
 2:   2:
 3:   3:
 4:   4:
 5:   5:
 5:   6:
  :   7:
 8:   8:
 9:   9:
10:  10:
11:  11:
12:  12:
13:  13:
14:  14:
15:  15:
```

SCREEN    00167    00A7

```
 0:   0:
 1:   1:
 2:   2:
 3:   3:
 4:   4:
 5:   5:
 6:   6:
 7:   7:
 8:   8:
 9:   9:
10:  10:
'1:  11:
 ':  12:
 J:  13:
14:  14:
15:  15:
```

SCREEN    00168    00A8

```
 0:   0:
 1:   1:
 ?:   2:
 ,:   3:
 4:   4:
 5:   5:
 6:   6:
 7:   7:
 8:   8:
 9:   9:
10:  10:
11:  11:
12:  12:
13:  13:
14:  14:
15:  15:
```

SCREEN    00169    00A9

```
 0:   0:
 1:   1:
 2:   2:
 3:   3:
 4:   4:
```

```
 5:    5:
 6:    6:
 7:    7:
  :    8:
  :    9:
10:   10:
11:   11:
12:   12:
13:   13:
14:   14:
15:   15:

SCREEN     00170    00AA

0:                                                                                              0:
 1:                                                                                              1:
 2:                                                                                              2:
 3:              PLEASE                                                                          3:
 4:                                                                                              4:
 5:        REMOVE CREDIT CARD                                                                    5:
 6:                                                                                              6:
 7:          AND SEE AGENT.                                                                      7:
 8:                                                                                              8:
 9:                                                                                              9:
10:                                                                                             10:
11:                                                                                             11:
12:    ------------------------------                                                           12:
 :         09-02-80                                                                             13:
 :         0 BOILER                                                                             14:
15:                                                                                             15:

SCREEN     00171    00AB

0:                                                     +--------+--------+------+              0:
  :                     @1   @2   @3                    \ BUTTON \ COLOR  \ NAME \              1:
  :                                                     +--------+--------+------+              2:
 3:                     @4   @5   @6                       1)      DRED     LOGO1               3:
 4:                                                        2)      DGREEN   LOGO2               4:
 5:           CUBIC WESTERN DATA                           3)      DBLUE    LOGO3               5:
 6:                AIRWAYS                                 4)      DRED     LOGO4               6:
 7:                                                        5)      DGREEN   LOGO5               7:
 8:      TO PURCHASE TICKETS INSERT                        6)      DBLUE    LOGO6               8:
 9:     CREDIT CARD IN SLOT AND DO NOT                                                          9:
10:       REMOVE IT UNTIL INSTRUCTED.                                                          10:
11:                                                                                             11:
12:    ------------------------------                                                           12:
13:        09-02-80                                                                             13:
14:        1 BOILER                                                                             14:
15:                                                                                             15:

SCREEN     00172    00AC

0:                                                     +--------+--------+------+              0:
 1:      PLEASE TOUCH SCREEN TO                         \ BUTTON \ COLOR  \ NAME \              1:
 2:        ANSWER MY QUESTIONS.                         +--------+--------+------+              2:
 3:                                                        1)      DGREEN   @@                  3:
 4:      DO YOU WISH TO CHARGE YOUR                        2)      DRED     @@                  4:
 5:      TICKET TO THE ACCOUNT OF                                                               5:
 :         @                                                                                    6:
  :                                                                                             7:
 8:                                                                                              8:
 9:             @1 YES      @2 NO                                                                9:
10:                                                                                             10:
11:                                                                                             11:
```

```
12: ------------------------------------
13:      08-29-80
14:      4 BOILER
15:
```

SCREEN   00173   00AD

```
 0:
 1:   WHEN DOES YOUR FLIGHT LEAVE?      \ BOTTON \ COLOR \ NAME \
 2:                                     +--------+-------+------+
 3:      @1 TODAY.                        1)     DGREEN    00
 4:                                       2)     DGREEN    00
 5:                                       3)     DGREEN    00
 6:      @2 NOT TODAY, BUT THIS MONTH.
 7:
 8:
 9:      @3 NEXT MONTH.
10:
11:
12: ------------------------------------
13:      08-29-80
14:      3 BOILER
15:
```

SCREEN   00174   00AE

```
 0:   PLEASE SELECT YOUR DESTINATION    +--------+-------+------+
 1:                                     \ PUTTON \ COLOR \ NAME \
 2:      @1  LOS ANGELES                +--------+-------+------+
 3:                                       1)     DGREEN    00
 4:      @2  SAN FRANSISCO                2)     DGREEN    00
 5:                                       3)     DGREEN    00
 6:      @3  RENO                         4)     DGREEN    00
 7:                                       5)     DGREEN    00
 8:      @4  LAS VEGAS
 9:
10:      @5  LAKE TAHOE
11:
12: ------------------------------------
13:      08-29-80
14:      4 BOILER
15:
```

SCREEN   00175   00AF

```
 0:   @                                 +--------+-------+------+
 1:                      FLT # CLASS    \ BUTTON \ COLOR \ NAME \
 2:   @                                 +--------+-------+------+
 3:   @                                   Y)     DGREEN    00
 4:   @                                   N)     DRED      00
 5:   @
 6:   @
 7:      DO YOU WISH TO PURCHASE A
 8:      TICKET FOR THIS ITINERARY?
 9:
10:         @Y YES     @N NO
11:
12: ------------------------------------
13:      09-02-80
14:      5 BOILER
15:
```

```
SCREEN    00176    00B0

0:
 1:
 2:
 3:
 4:      T R A N S A C T I O N
 5:
 6:            C A N C E L E D
 7:
 8:
 9:
10:
11:
12: ---------------------------------
13:            09-09-82
14:            6 BOILER
15:

SCREEN    00177    00B1

0:
 1:
 2:
 3:       Y O U R    T I C K E T
 4:
 5:           I S    B E I N G
 6:
 7:          P R I N T E D . . .
 8:
 9:
10:
11:
12: ---------------------------------
13:            08-29-80
14:            7 BOILER
15:

SCREEN    00178    00B2

0:
 1:
 2:    PLEASE REMOVE CREDIT CARD
 3:
 4:    AND RETRIEVE TICKET BELOW.
 5:
 6:
 7:
 8:       THANK YOU FOR FLYING
 9:
10:           CUBIC AIRLINES.
11:
12: ---------------------------------
13:
14:            08-29-80
15:            8 BOILER
```

```
SCREEN    00179    00P3

0:           W E    A R E
 1:
 2:      L O O K I N G    F O R
 3:
 4:              Y O U R
 5:
 6:      R E S E R V A T I O N .
 7:
 8:            ----------
 9:
10:   P L E A S E    S T A N D    B Y .
11:
12: ------------------------------
13:         08-29-80
14:         9 BOILER
15:

SCREEN    00180    00P4

0:                                        +--------+--------+------+
 1:   PLEASE SELECT YOUR SEAT              \ BUTTON \ CCLOR  \ NAME \
 2:                                        +--------+--------+------+
 3:      Q1 SMOKING, WINDOW                    1)     DGREEN    00
 4:                                            2)     DGREEN    00
 5:      Q2 SMOKING, AISLE                     3)     DGREEN    00
 6:                                            4)     DGREEN    00
 7:      Q3 NON-SMOKING, WINDOW
 8:
 9:      Q4 NON-SMOKING, AISLE
10:
11:
12: ------------------------------
13:         09-10-80
14:         10 BOILER
15:

SCREEN    00181    00P5

0:
 1:        SORRY, THE PRINTER IS
 2:
 3:          OUT OF SERVICE.
 4:
 5:
 6:    PLEASE REMOVE CREDIT CARD !
 7:
 8:
 9:          AND SEE AGENT.
10:
11:
12: ------------------------------
13:         08-29-80
14:         11 BOILER
15:
```

SCREEN   00182   00B6

```
 0:
 1:
 2:         SORRY, WE CANNOT FIND
 3:
 4:        YOUR RESERVATION. PLEASE
 5:
 6:           REMOVE CREDIT CARD
 7:
 8:              AND SEE AGENT
 9:
10:
11:
12: ------------------------------
13:       08-29-80
14:       12 BOILER
15:
```

SCREEN   00183   00B7

```
 0:
 1:
 2:
 3:
 4:
 5:         SORRY, POSITION CLOSED.
 6:
 7:            PLEASE SEE AGENT.
 8:
 9:
10:
11:
12: ------------------------------
13:       09-03-80
14:       13 BOILER
15:
```

SCREEN   00184   00B8

```
 0:   PLEASE ENTER DAY OF
 1:        DEPARTURE IN
 2:           @
 3:
 4:     @1  @2  @3
 5:                    IS DATE
 6:     @4  @5  @6     CORRECT ?
 7:
 8:     @7  @8  @9      @Y  YES
 9:
10:         @0          @N  NO
11:
12: ------------------------------
13:       09-08-80
14:
15:       14 BOILER
```

| BUTTON | COLOR  | NAME |
|--------|--------|------|
| 1)     | CYAN   | K1   |
| 2)     | CYAN   | K2   |
| 3)     | CYAN   | K3   |
| 4)     | CYAN   | K4   |
| 5)     | CYAN   | K5   |
| 6)     | CYAN   | K6   |
| 7)     | CYAN   | K7   |
| 8)     | CYAN   | K8   |
| 9)     | CYAN   | K9   |
| Y)     | DGREEN | 00   |
| 0)     | CYAN   | K0   |
| N)     | DRED   | 00   |

```
SCREEN    00185   00B9

0:
 1:       PLEASE SELECT YOUR FARE           +--------+--------+------+
 2:                                         \ BUTTON \ COLOR  \ NAME \
 3:         @1   ROUND TRIP, FIRST CLASS    +--------+--------+------+
 4:                                             1)     DGREEN    00
 5:         @2   ROUND TRIP, COACH              2)     DGREEN    00
 6:                                             3)     DGREEN    00
 7:         @3   ONE WAY, FIRST CLASS           4)     DGREEN    00
 8:
 9:         @4   ONE WAY, COACH
10:
11:
12:       ------------------------------
13:         09-22-80
14:         15  BOILER
15:

SCREEN    00186   00BA

0:
 1:       DO YOU WISH TO:                   +--------+--------+------+
 2:                                         \ BUTTON \ COLOR  \ NAME \
 3:                                         +--------+--------+------+
 4:         @1   CONFIRM A RESERVATION.         1)     DGREEN    00
 5:                                             2)     DGREEN    00
 6:
 7:         @2   BOOK A RESERVATION ON THE
 8:              NEXT AVAILABLE FLIGHT.
 9:
10:
11:
12:       ------------------------------
13:         09-22-80
14:         16   BOILER
15:

SCREEN    00187   00BB

0: ............................................................
 1: ............................................................
 2: ..@@@@......................................................
 3: .@@@@@@.....................................................
 4: @@@@@@@.....................................................
 5: @@@@@@@.....................................................
 6: @@@@@@@.....................................................
 7: @@@@@@@.....................................................
 8: .@@@@@@.....................................................
 9: ..@@@@......................................................
10: ............................................................
11: ............................................................
12: ............................................................
13: ............................................................
14: ............................................................
15: ............................................................

SCREEN    00188   00BC

0: ............................................................
 1: ............................................................
 2: ............................................................
 3: ............................................................
 4: ............................................................
 5: ............................................................
```

```
 6: ...................................................................  6:
 7: ...................................................................  7:
 8: ...................................................................  8:
 9: ...................................................................  9:
10: ................................................................... 10:
11: ................................................................... 11:
12: ................................................................... 12:
13: ................................................................... 13:
14: ................................................................... 14:
15: ................................................................... 15:
```

SCREEN     00189     00BD

```
 0: ...................................................................  0:
 1: ...................................................................  1:
 2: ...................................................................  2:
 3: ...................................................................  3:
 4: ...................................................................  4:
 5: ...................................................................  5:
 6: ...................................................................  6:
 7: ...................................................................  7:
 8: ...................................................................  8:
 9: ...................................................................  9:
10: ................................................................... 10:
11: ................................................................... 11:
12: ................................................................... 12:
13: ................................................................... 13:
14: ................................................................... 14:
15: ................................................................... 15:
```

SCREEN     00190     00BE

```
 0: ...................................................................  0:
 1: ...................................................................  1:
 2: ...................................................................  2:
 3: ...................................................................  3:
 4: ...................................................................  4:
 5: ...................................................................  5:
 6: ...................................................................  6:
 7: ...................................................................  7:
 8: ...................................................................  8:
 9: ...................................................................  9:
10: ................................................................... 10:
11: ................................................................... 11:
12: ................................................................... 12:
13: ................................................................... 13:
14: ................................................................... 14:
15: ................................................................... 15:
```

SCREEN     00191     00BF

```
 0: ...................................................................  0:
 1: ...................................................................  1:
 2: ............@....@@..@@....@.@.....@.@....@.......@@..........@@...  2:
 3: ............@.....@...@....@.@....@@@@@@.@.@...@.@.@.@.......@@...  3:
 4: ............@....@...@...@@@@@@@.@.@.@....@...@..@..@........@...  4:
 5: ............@................@.@...@.@.@......@...@@..........@....  5:
 6: ............@...............@.@....@@@@@.....@.....@@..........  6:
 7: ............@..............@.@....@.@.@.....@....@.@.@.......  7:
 8: ..................@@@@@@@...@.@.@..@...@.@....@@..  8:
 9: ...........................@.@...@@@@@.@...@.@.@....@.........  9:
10: .............@..............@.@......@.@........@...@@@@.@.......... 10:
11: ................................................................... 11:
12: ................................................................... 12:
13: ................................................................... 13:
```

```
14: ..................................................................... 14:
15: ..................................................................... 15:

SCREEN    00192    00C0

0: ..................................................................... 0:
 1: ..................................................................... 1:
 2: ....@.......@...........@............................................ 2:
 3: ...@........@....@.@..@.............................................@. 3:
 4: ..@.........@...@.@.@....@.........................................@.. 4:
 5: ..@.........@...@@@......@........................................@... 5:
 6: ..@.........@...@...@@@@@@.......@@@@@@..........................@.... 6:
 7: ..@.........@...@@@......@........................................@... 7:
 8: ..@.........@...@.@.@....@.........................................@.. 8:
 9: ...@........@....@.@..@...@......@@.............................@@...@ 9:
10: ....@.....@...........@..........@@..............................@@... 10:
11: ................................@.................................... 11:
12: .................)..............@..................................... 12:
13: ..................................................................... 13:
14: ..................................................................... 14:
15: ..................................................................... 15:

SCREEN    00193    00C1

0: ..................................................................... 0:
 1: ..................................................................... 1:
 2: ..@@@......@....@@@@@..@@@@@..@....@..@@@@@@@...@@@@..@@@@@@. 2:
 3: .@...@@...@@....@.....@.@.....@.@....@.@.........@......@....@.. 3:
 4: @....@@..@.@...........@.......@.@....@.@........@.......@..@.. 4:
 5: @...@.@.@...........@.......@.@....@.@.........@........@... 5:
 6: @..@..@....@......@@@.....@@@..@@@@@@.@@@@@..@.@@@@.....@.... 6:
 7: @.@...@....@.....@.........@.......@.@........@.@@....@...@...... 7:
 8: @@...@....@.....@.........@.......@.@........@.@....@.@...... 8:
 9: @@...@....@......@.......@........@.@........@.@....@.@...... 9:
10: ..@@@....@@@@@.@@@@@@..@@@@@.......@...@@@@@...@@@@@...@...... 10:
11: ..................................................................... 11:
12: ..................................................................... 12:
13: ..................................................................... 13:
14: ..................................................................... 14:
15: ..................................................................... 15:

SCREEN    00194    00C2

0: ..................................................................... 0:
 1: ..................................................................... 1:
 2: ..@@@....@@@@@..............................@.........@......@@@@@.. 2:
 3: .@...@..@......@............................@.........@......@.....@. 3:
 4: @......@.@.....@............................@..........@......@. 4:
 5: .@...@..@......@.....@@.....@@.....@.....@@@@@@@.....@........@. 5:
 6: ..@@@....@@@@@....@@......@@....@..........................@......@@.. 6:
 7: .@...@....@............@.....................@.........@......@.... 7:
 8: @.....@........@............................@....@@@@@@@....@.....@. 8:
 9: .@...@........@.....@@......@@.....@.....@..............@......@..... 9:
10: ..@@@........@.....@@......@@......@........@...........@........@... 10:
11: ..................@.................................................. 11:
12: ..................@................................................... 12:
13: ..................................................................... 13:
14: ..................................................................... 14:
15: ..................................................................... 15:

SCREEN    00195    00C3

0: ..................................................................... 0:
 1: ..................................................................... 1:
```

```
 :..@@@@.....@....@@@@@.....@@@@..@@@@@...@@@@@@@.@@@@@@...@@@@..  2:
3: .@....@...@.@......@...@...@....@...@..@..@..@......@.......@. 3:
4: @..@@.@..@.@...@...@...@....@.@..@....@...@.@......@.......... 4:
5: @.@.@.@.....@..@....@..@..@....@......@...@.@......@.......... 5:
6: @.@.@.@.....@..@@@@..@....@....@.......@..@.@@@@@..@@@@....@.. 6:
7: @.@@@@@.@@@@@@..@...@..@..@....@....@..@..@.@......@......@@@. 7:
8: @......@...@....@.@...@.@...@...@......@..@.@......@........@. 8:
9: .@....@.@...@...@.@...@..@...@....@...@...@.@......@.......@@. 9:
10:..@@@@..@.....@.@@@@@....@@@@..@@@@@...@@@@@@@.@..........@@@.@. 10:
11: ............................................................. 11:
12: ............................................................. 12:
13: ............................................................. 13:
14: ............................................................. 14:
15: ............................................................. 15:

SCREEN    00196    00C4

0: ............................................................. 0:
1: ............................................................. 1:
2: @.....@...@@@...........@.@.....@.@......@....@.@.....@...@@@... 2:
3: @.....@...@........@....@.@....@...@....@....@...@....@.@...@.. 3:
4: @.....@...@........@....@.@...@.....@..@....@@..@@.@@....@....@. 4:
5: @.....@...@........@....@.@..@.......@@....@.@.@.@.@.@...@....@. 5:
6: @@@@@@@....@........@....@.@.@.........@....@.@.@.@.@.@...@....@. 6:
7: @.....@....@........@....@.@@.@.........@....@..@.@.@..@.@.@....@. 7:
8: @.....@....@....@...@....@.@...@.........@....@...@.@...@@.@....@. 8:
9: @.....@....@....@...@....@.@....@.........@....@...@.@...@.@...@. 9:
10:@.....@....@@@....@@@...@......@.@@@@@@@.@....@.@.....@...@@@... 10:
11: ............................................................. 11:
12: ............................................................. 12:
13: ............................................................. 13:
14: ............................................................. 14:
15: ............................................................. 15:

SCREEN    00197    00C5

0: ............................................................. 0:
1: ............................................................. 1:
2: @@@@@@....@@@...@@@@@@....@@@@.@@@@@@.@.....@.@.....@.@......@. 2:
3: @.....@..@...@..@....@..@....@...@....@.....@.@.....@.@......@. 3:
4: @.....@.@.....@.@....@.@.........@....@.....@.@.....@.@......@. 4:
5: @.....@.@.....@.@....@.@.........@....@.....@.@...@.@.@......@. 5:
6: @@@@@@..@.....@.@@@@@@....@@@....@....@.....@.@...@.@.@...@..@. 6:
7: @.......@.....@.@..@.........@...@....@.....@.@...@.@.@..@.@.@. 7:
8: @.......@...@.@.@.@.@........@...@....@.....@.@.@.@.@.@.@.@.@. 8:
9: @........@...@..@..@.@..@....@...@....@.....@..@.@..@.@@.@@.@. 9:
10:@..........@@@.@.@....@...@@@@....@.....@@@......@.....@....@.. 10:
11: ............................................................. 11:
12: ............................................................. 12:
13: ............................................................. 13:
14: ............................................................. 14:
15: ............................................................. 15:

SCREEN    00198    00C6

0: ............................................................. 0:
1: ............................................................. 1:
2: @.....@.@......@.@@@@@@@.@@@@@@@........@@@@@@@................ 2:
3: @.....@.@......@....@.....@@......@......@@................ 3:
4: .@...@...@...@..@.....@....@@......@......@@................ 4:
5: ..@.@.....@.@...@.......@..@@......@......@@...........@... 5:
6: ...@.......@....@....@....@.....@......@@...@.@........ 6:
7: ..@.@......@....@.....@....@......@......@@..@...@...... 7:
8: .@...@....@.....@......@....@......@......@@.@......@.... 8:
9: @.....@..@......@.......@....@@......@......@@............ 9:
10:@.....@..@....@....@@@@@@@.@@@@@@@........@@@@@@@........@@@@@@@. 10:
```

```
11: ............................................................. 11:
12: ............................................................. 12:
13: ............................................................. 13:
14: ............................................................. 14:
15: ............................................................. 15:

SCREEN    00199    00C7

0: ............................................................. 0:
 1: ...........@..................@.................@@........... 1:
 2: ..@@.......@..................@..................@...@....... 2:
 3: ..@@.......@..................@..................@........... 3:
 4: ..@........@..................@..................@........... 4:
 5: ...@......@@@@...@.@@@....@@@@....@@@.@...@@@@.....@....@@@.@.. 5:
 6: ..........@..@@...@..@....@.@...@@..@....@..@@@@@...@...@@... 6:
 7: .........@@@@@...@..@....@.....@..@..@...@.......@......@.... 7:
 8: .........@....@..@..@.....@.....@..@..@..@@@@@..........@.... 8:
 9: .........@..@@.@@..@......@.....@..@..@......@..........@@... 9:
10: .........@@@.@..@.@@@....@@@@....@@@.@...@@@@.....@.....@@@.@.. 10:
11: .............................................................. 11:
12: ............................................................@..@.. 12:
13: ........................................................@@@@... 13:
14: .............................................................. 14:
15: .............................................................. 15:

SCREEN    00200    00C8

0: ............................................................. 0:
 1: ............................................................. 1:
 2: @..........................@......@@......................... 2:
 3: @..........................@......@.......................... 3:
 4: @...............@.........@..@....@.......................... 4:
 5: @.@@@...........@.........@..@....@....@.@.@@..@.@@@....@@@@.. 5:
 6: @@...@...@@.....@.........@..@....@...@@.@..@.@@...@..@....@.. 6:
 7: @....@...@......@.........@..@....@...@..@..@..@...@..@....@.. 7:
 8: @....@...@......@.........@@@.@...@...@..@..@..@...@..@....@.. 8:
 9: @....@...@......@.........@..@....@...@..@..@..@...@..@....@.. 9:
10: @....@...@@@....@.........@..@....@@@.@..@..@..@...@..@@@@... 10:
11: ................@.........@................................... 11:
12: ................@@@@.......................................... 12:
13: .............................................................. 13:
14: .............................................................. 14:
15: .............................................................. 15:

SCREEN    00201    00C9

0: ............................................................. 0:
 1: ............................................................. 1:
 2: ............................................................. 2:
 3: ..............................................@.............. 3:
 4: ..............................................@.............. 4:
 5: @.@@@....@@@.@..@.@@@....@@@@@..@@@@@...@....@..@..@....@.@....@. 5:
 6: @@...@..@..@...@@..@....@.@.....@.......@...@..@..@..@...@.@....@. 6:
 7: @....@..@......@...@....@.......@@@@....@...@..@..@..@...@.@.@..@. 7:
 8: @....@..@......@...@....@.......@.......@..@...@..@..@...@.@.@..@. 8:
 9: @@..@...@......@...@............@...@...@@....@.@.@..@.@..@.@.@.@. 9:
10: @.@@@....@@@....@@@.@..@.........@@@@@...@@...@@@.@....@....@..@.. 10:
11: @............@................................................ 11:
12: @............@................................................ 12:
13: @............@................................................ 13:
14: .............................................................. 14:
15: .............................................................. 15:
```

SCREEN    00202    00CA

```
 0: ...................................................................  0:
 1: ...................................................................  1:
 2: ................................@......@......@.....@@..@.....@.@.@..  2:
 3: ...............................@......@......@....@..@@...@.@.@.@...  3:
 4: ...............................@......@......@....................@.@.@..  4:
 5: @....@..@....@..@@@@@.....@......@......@................@.@.@.@..  5:
 6: .@..@...@....@......@......@......@......@................@.@.@...  6:
 7: ..@@....@....@....@........@......@......@................@.@.@.@.  7:
 8: ..@@....@....@....@........@......@......@................@.@.@..  8:
 9: .@..@...@...@@...@.........@......@......@................@.@.@.@.  9:
10: @....@...@@@.@..@@@@@.....@......@.....@..................@.@.@.. 10:
11: ...............@...................................................... 11:
12: .........@....@....................................................... 12:
13: ........@@@@........................................................... 13:
14: ........................................................................ 14:
15: ........................................................................ 15:
```

SCREEN    00203    00CB

```
 0: @@@@@@@@@@@@@@.@@@@@@@@@@@@@@.@@@@@@@@@@@@@................  0:
 1: @..............@.@...............@.@..................@........  1:
 2: @.@@@@@@@@@@.@.@.@...@.........@.@.@@@@@......@.........  2:
 3: @.@.........@.@.@.@@...@.........@.@.@...@.........@.........  3:
 4: @.@.@@@@@@.@.@.@.@.@.@.........@.@.@...@.........@.........  4:
 5: @.@.@....@.@.@.@.@..@@..........@.@.@...@.........@.........  5:
 6: @.@.@.@@@.@.@.@.@.@...@.........@.@.@...@.........@.........  6:
 7: @.@.@.@@@.@.@.@.@.......@@@@@.@.@.@@@@@.........@.........  7:
 8: @.@.@.@@@.@.@.@.@.........@.@.@.........@..@..@.........  8:
 9: @.@.@.....@.@.@.@.........@...@.@.........@.@..@.........  9:
10: @.@.@@@@@@.@.@.@..........@..@.@.@.......@@.........@......... 10:
11: @.@..........@.@.@........@...@.@.@.......@...........@......... 11:
12:  : @.@@@@@@@@@@.@.@.......@@@@.@.@.......@..@..@......... 12:
13:  : @............@.@...........@.@................@......... 13:
14: @@@@@@@@@@@@@@.@@@@@@@@@@@@@@.@@@@@@@@@@@@@................. 14:
15: ........................................................................ 15:
```

SCREEN    00204    00CC

```
 0: @@@@@@@@@@@@@@.@@@@@@@@@@@@@@.@@@@@@@@@@@@@.@@@@@@@@@@@@@.  0:
 1: @..............@.@...............@.@..............@.@..............@.  1:
 2: @..............@.@...............@.@..............@.@..............@.  2:
  : @......@......@.@....@@@@@....@.@....@@@@@....@.@...@....@....@.  3:
 4: @....@@......@.@...@.....@...@.@...@......@...@.@...@....@....@.  4:
 5: @....@.@.....@.@..@......@..@.@..@......@..@.@..@..@...@....@.  5:
 6: @.....@......@.@..@.......@..@.@..@.......@..@.@..@...@....@.  6:
 7: @.....@......@.@.....@@@.....@.@.....@@@....@.@...@@@@@@...@.  7:
 8: @.....@......@.@......@......@.@......@......@.@......@......@.  8:
 9: @.....@......@.@......@......@.@......@......@.@......@......@.  9:
10: @.....@......@.@......@......@.@......@......@.@......@......@. 10:
11: @....@@@@@....@.@...@@@@@@...@.@....@@@@....@.@......@......@. 11:
12: @............@.@.............@.@.............@.@......@......@. 12:
13: @............@.@.............@.@.............@.@......@......@. 13:
14: @@@@@@@@@@@@@@.@@@@@@@@@@@@@@.@@@@@@@@@@@@@.@@@@@@@@@@@@@. 14:
15: ........................................................................ 15:
```

```
SCREEN   00205   00CD

0: @@@@@@@@@@@@@@@.@@@@@@@@@@@@@@@.@@@@@@@@@@@@@@@.@@@@@@@@@@@@@@@.  0:
 1: @..............@.@..............@.@..............@.@..............@.  1:
 2: @..............@.@..............@.@..............@.@..............@.  2:
 3: @...@@@@@@@...@.@.....@@@@....@.@...@@@@@@....@.@.....@@@.....@.  3:
 4: @...@.........@.@....@........@.@...@......@...@.@.....@...@....@.  4:
 5: @...@.........@.@...@.........@.@....@....@....@.@.....@...@....@.  5:
 6: @...@.........@.@...@.........@.@....@....@....@.@.....@...@....@.  6:
 7: @...@@@@@@...@.@...@.@@@@...@.@.........@......@.@.....@@@.....@.  7:
 8: @.........@...@.@...@@.....@...@.@......@......@.@.....@...@....@.  8:
 9: @.........@...@.@...@......@...@.@......@......@.@.....@...@....@.  9:
10: @...@.....@...@.@...@......@...@.@......@......@.@.....@...@....@. 10:
11: @....@@@@....@.@....@@@@....@.@....@..........@.@.....@@@......@. 11:
12: @..............@.@..............@.@..............@.@..............@. 12:
13: @..............@.@..............@.@..............@.@..............@. 13:
14: @@@@@@@@@@@@@@@.@@@@@@@@@@@@@@@.@@@@@@@@@@@@@@@.@@@@@@@@@@@@@@@. 14:
15: ................................................................ 15:

SCREEN   00206   00CE

0: @@@@@@@@@@@@@@@.@@@@@@@@@@@@@@@.@@@@@@@@@@@@@@@.@@@@@@@@@@@@@@@.  0:
 1: @..............@.@..............@.@..............@.@..............@.  1:
 2: @..............@.@..............@.@..............@.@....@...@....@.  2:
 3: @....@@@@@....@.@..@...@...@.@.@.....@@@......@.@....@...@....@.  3:
 4: @...@.....@...@.@...@..@..@...@.@....@...@....@.@....@...@....@.  4:
 5: @...@.....@...@.@....@.@.@....@.@......@......@.@..@@@@@@@@..@.  5:
 6: @...@.....@...@.@.....@@@.....@.@......@......@.@....@...@....@.  6:
 7: @....@@@@@...@.@..@@@@@@@@..@.@......@......@.@....@...@....@.  7:
 8: @........@....@.@.....@@@.....@.@......@......@.@....@...@....@.  8:
 9: @........@....@.@.@.@.@.@.@.@.@......@......@.@..@@@@@@@@..@.  9:
10: @.......@.....@.@..@..@..@..@.@......@...@....@.@....@...@....@. 10:
11: @.....@.......@.@...@...@...@.@....@@@......@.@....@...@....@. 11:
12: @..............@.@..............@.@..............@.@....@...@....@. 12:
13: @..............@.@..............@.@..............@.@..............@. 13:
14: @@@@@@@@@@@@@@@.@@@@@@@@@@@@@@@.@@@@@@@@@@@@@@@.@@@@@@@@@@@@@@@. 14:
15: ................................................................ 15:

SCREEN   00207   00CF

0: ................................................................  0:
 1: ................................................................  1:
 2: ................................................................  2:
 3: ................................................................  3:
 4: ................................................................  4:
 5: .....................................................@@@@@.....  5:
 6: ....@@@@@@@@....@@.........@@..@@@@@@@@@@......@@@@........  6:
 7: ...@@@@@@@@@@...@@.........@@..@@@@@@@@@@......@@@@@........  7:
 8: ..@@@......@@@..@@.........@@..@@.......@@@........@@@@@@@@@@@@  8:
 9: .@@@.........@@..@@.........@@..@@......@@@.....@@@@.@@@.@.@.  9:
10: @@@..........@@..@@.........@@..@@......@@@....@@@@@.@@@@@@@ 10:
11: @@...........@@..@@.........@@..........@@.............@@@@@@@@@ 11:
12: @@...........@@..@@.........@@..........@@......................@@ 12:
13: @@...........@@..@@.........@@..........@@......................   13:
14: @@...........@@..@@.........@@..........@@......................   14:
15: @@...........@@..@@.........@@..........@@......................   15:
```

```
SCREEN    00208    00D0

0: @@..............@@........@@..@@........@@................... 0:
 1: @@..............@@....@@....@@..@@........@@................. 1:
 2: @@..............@@....@@....@@..@@........@@................. 2:
 3: @@..............@@....@@....@@..@@........@@................. 3:
 4: @@..............@@....@@....@@..@@........@@................. 4:
 5: @@..............@@....@@....@@..@@........@@................. 5:
 6: @@..............@@....@@....@@..@@........@@................. 6:
 7: @@..............@@....@@....@@..@@........@@................. 7:
 8: @@..............@@....@@....@@..@@........@@..@@@@@@@@@@@@@.. 8:
 9: @@..............@@....@@....@@..@@........@@...@.@.@.@.@.@@@. 9:
10: @@..............@@....@@....@@..@@........@@..@@@@@@@@@@@@@@ 10:
11: @@@.............@@....@@@@..@@..@@........@@@..@@@@@@@@@@@@@. 11:
12: .@@@........@@..@@@.@@@@@@.@@@..@@........@@@...@@@@@@@.....@... 12:
13: ..@@@.....@@@..@@@@@..@@@@@...@@.......@@@....@@..........@... 13:
14: ...@@@@@@@@@@.....@@@....@@@....@@@@@@@@@@.....@..@........@.@.. 14:
15: ....@@@@@@@@.......@......@.....@@@@@@@@@........................ 15:

SCREEN    00209    00D1

0: ............................................................ 0:
 1: ............................................................ 1:
 2: ............................................................ 2:
 3: ............................................................ 3:
 4: ...@@......@@.................................@@.....@@... 4:
 5: ..@..@....@..@....@@......@@......@@......@@....@..@....@..@.. 5:
 6: .@....@..@....@..@..@....@..@....@..@....@..@..@....@..@....@. 6:
 7: ..........@....@..@....@..@....@..@....@.................... 7:
 8: ............................................................ 8:
 9: ............................................................ 9:
10: ..@.......@...........................................@...@.. 10:
11: ..@.......@.......@.......@.......@.......@.......@...@.. 11:
12: ..................@.......@.......@.......@................ 12:
13: ............................................................ 13:
14: ............................................................ 14:
15: ............................................................ 15:

SCREEN    00210    00D2

0: BAKER/JOE/MRS./              CA123/                          0:
 1: 15AUG80/                     10AUG80/                        1:
 2: 0915/                        1145/                           2:
 3: 1/                           $115.20/                        3:
 4: SAN DIEGO/                   SAN DIEGO/                      4:
 5:                                                              5:
 6: SAN DIEGO/LOS ANGELES/CA/123/Y/15AUG80/0915/                  6:
 7: LOS ANGELES/SAN FRANCISCO/CA/456/Y/15AUG80/1030/              7:
 8: SAN FRANCISCO/LOS ANGELES/CA/653/Y/16AUG80/0920/              8:
 9: LOS ANGELES/SAN DIEGO/CA/267/Y/16AUG80/1340/                  9:
10:                                                             10:
11: MC45672345/                                                 11:
12: WANTS HERTZ RENTAL CAR ON ARRIVAL SAN FRANCISCO./           12:
13:                                                             13:
14:                                                             14:
15:                                                             15:

SCREEN    00211    00D3

0: STEPHENS/JOE/MR./            CA389/                          0:
 1: 03SEP80/                     10AUG80/                        1:
 2: 1445/                        1145/                           2:
 3: 1/                           $124.75/                        3:
 4: SAN DIEGO/                   SALT LAKE CITY/                 4:
 5:                                                              5:
```

```
 6: SAN DIEGO/LOS ANGELES/CA/389/Y/15AUG80/1445/
 7: LOS ANGELES/SALT LAKE CITY/CA/227/Y/15AUG80/1700/
 8:
 9:
10:
11: MC45672345/
12: WANTS HERTZ RENTAL CAR ON ARRIVAL SALT LAKE CITY./
13:
14:
15:
```

SCREEN    00212    00D4

```
 0: KELLY/GUY/MR./                    CA721/
 1: 15AUG80/                          10AUG80/
 2: 0915/                             2030/
 3: 1/                                $245.70/
 4: SAN DIEGO/                        DETROIT/
 5:
 6: SAN DIEGO/LOS ANGELES/CA/721/Y/15AUG80/0915/
 7: LOS ANGELES/DETROIT/CA/692/Y/15AUG80/1030/
 8:
 9:
10:
11: MC45672345/
12: WANTS HERTZ RENTAL CAR ON ARRIVAL DETROIT./
13:
14:
15:
```

SCREEN    00213    00D5

```
 0: STEVENS/JOE/MR./                  CA182/
 1: 05SEP80/                          05SEP80/
 2: 0810/                             1745/
 3: 1/                                $137.20/
 4: SAN DIEGO/                        HAWAII/
 5:
 6: SAN DIEGO/LOS ANGELES/CA/182/Y/05SEP80/0810/
 7: LOS ANGELES/HAWAII/CA/466/Y/05SEP80/0900/
 8: HAWAII/SAN DIEGO/CA/523/Y/15SEP80/1350/
 9:
10:
11: MC45672345/
12: WANTS HERTZ RENTAL CAR ON ARRIVAL HOUSTON/
13:
14:
15:
```

SCREEN    00214    00D6

```
 0: DE KOZAN/RAY/MR./                 CA754/
 1: 15AUG80/                          10AUG80/
 2: 0700/                             2045/
 3: 1/                                $324.80/
 4: SAN DIEGO/                        BOSTON/
 5:
 6: SAN DIEGO/CHICAGO/CA/754/F/15AUG80/0700/
 7: CHICAGO/BOSTON/CA/466/F/15AUG80/1605/
 8:
 9:
10:
11: MC45672345/
12: WANTS HERTZ RENTAL CAR ON ARRIVAL BOSTON./
```

```
SCREEN     00215    00D7

0: ZABLE/WALTER/MR./            CA338/
 1: 15AUG80/                     10AUG80/
 2: 0650/                        1320/
 3: 1/                           $275.00/
 4: SAN DIEGO/                   ATLANTA/
 5:
 6: SAN DIEGO/LOS ANGELES/CA/338/F/15AUG80/0650/
 7: LOS ANGELES/ATLANTA/CA/580/F/15AUG80/1030/
 8:
 9:
10:
11: MC45672345/
12: WANTS HERTZ RENTAL CAR ON ARRIVAL ATLANTA./
13:
14:
15:

SCREEN     00216    00D8

0: DORTZ/REGINALD/MR./          CA779/
 1: 15AUG80/                     10AUG80/
 2: 1010/                        1900/
 3: 1/                           $324.40/
 4: SAN DIEGO/                   NORFOLK/
 5:
 6: SAN DIEGO/LOS ANGELES/CA/779/Y/15AUG80/1010/
 7: LOS ANGELES/WASHINGTON/CA/368/Y/15AUG80/1130/
 8: WASHINGTON/NORFOLK/CA/626/Y/15AUG80/1825/
 9:
10:
11: MC45672345/
12: WANTS HERTZ RENTAL CAR ON ARRIVAL NORFOLK./
13:
14:
15:

SCREEN     00217    00D9

0: KRESSMAN/BEN/MR./             CA123/
 1: 15AUG80/                      10AUG80/
 2: 0915/                         1145/
 3: 1/                            $72.60/
 4: SAN DIEGO/                    SAN FRANCISCO/
 5:
 6: SAN DIEGO/LOS ANGELES/CA/123/Y/15AUG80/0915/
 7: LOS ANGELES/SAN FRANCISCO/CA/456/Y/15AUG80/1030/
 8:
 9:
10:
11: MC45672345/
12: WANTS HERTZ RENTAL CAR ON ARRIVAL SAN FRANCISCO./
13:
14:
15:
```

SCREEN    00218    00DA

```
 0: WALKER/SAM/MR./                  CA556/                           0:
 1: 15AUG80/                         10AUG80/                         1:
 2: 1450/                            1830/                            2:
 3: 1/                               $157.80/                         3:
 4: SAN DIEGO/                       DENVER/                          4:
 5:                                                                   5:
 6: SAN DIEGO/DENVER/CA/556/Y/15AUG80/1450/                           6:
 7:                                                                   7:
 8:                                                                   8:
 9:                                                                   9:
10:                                                                  10:
11: MC45672345/                                                      11:
12: WANTS HERTZ RENTAL CAR ON ARRIVAL DENVER./                       12:
13:                                                                  13:
14:                                                                  14:
15:                                                                  15:
```

SCREEN    00219    00DB

```
 0: WINKLES/BILLY/MR./                CA774/                          0:
 1: 15AUG80/                          10AUG80/                        1:
 2: 0915/                             1345/                           2:
 3: 1/                                $167.50/                        3:
 4: SAN DIEGO/                        KANSAS CITY/                    4:
 5:                                                                   5:
 6: SAN DIEGO/LOS ANGELES/CA/774/Y/15AUG80/0915/                      6:
 7: LOS ANGELES/KANSAS CITY/CA/495/Y/15AUG80/1105/                    7:
 8:                                                                   8:
 9:                                                                   9:
10:                                                                  10:
11: MC45672345/                                                      11:
12: WANTS HERTZ RENTAL CAR ON ARRIVAL KANSAS CITY./                  12:
13:                                                                  13:
14:                                                                  14:
15:                                                                  15:
```

SCREEN    00220    00DC

```
 0:                                                                   0:
 1: 15SEP80/                          15SEP80/                        1:
 2: 1430/                             1545/                           2:
 3: 1/                                                                3:
 4: SAN DIEGO/                                                        4:
 5:                                                                   5:
 6: SAN DIEGO/                                                        6:
 7:                                                                   7:
 8:                                                                   8:
 9:                                                                   9:
10:                                                                  10:
11: MC45672345/                                                      11:
12:                                                                  12:
13:                                                                  13:
14:                                                                  14:
15:                                                                  15:
```

SCREEN    00221    00DD

```
 0: GGGGGGGGGGGGGGGGGGGGGGGGGGGGGGGGGGGGGGGGGGGGGGGGGGGGGGGGGG         0:
 1: GGGGGGGGGGGGGGGGGGGGGGGGGGGGGGGGGGGGGGGGGGGGGGGGGGGGGGGGGG         1:
 2: GGGGGGGGGGGGGGGGGGGGGGGGGGGGGGGGGGGGGGGGGGGGGGGGGGGGGGGGGG         2:
 3: GGGGGGGGGGGGGGGGGGGGGGGGGGGGGGGGGGGGGGGGGGGGGGGGGGGGGGGGGG         3:
 4: GGGGGGGGGGGGGGGGGGGGGGGGGGGGGGGGGGGGGGGGGGGGGGGGGGGGGGGGGG         4:
```

```
 5: GGGGGGGGGGGGGGGGGGGGGGGGGGGGGGGGGGGGGGGGGGGGGGGGGGGGGGG  5:
 6: GGGGGGGGGGGGGGGGGGGGGGGGGGGGGGGGGGGGGGGGGGGGGGGGGGGGGGG  6:
 7: GGGGGGGGGGGGGGGGGGGGGGGGGGGGGGGGGGGGGGGGGGGGGGGGGGGGGGG  7:
 8: GGGGGGGGGGGGGGGGGGGGGGGGGGGGGGGGGGGGGGGGGGGGGGGGGGGGGGG  8:
 9: GGGGGGGGGGGGGGGGGGGGGGGGGGGGGGGGGGGGGGGGGGGGGGGGGGGGGGG  9:
10: GGGGGGGGGGGGGGGGGGGGGGGGGGGGGGGGGGGGGGGGGGGGGGGGGGGGGGG 10:
11: GGGGGGGGGGGGGGGGGGGGGGGGGGGGGGGGGGGGGGGGGGGGGGGGGGGGGGG 11:
 :  GGGGGGGGGGGGGGGGGGGGGGGGGGGGGGGGGGGGGGGGGGGGGGGGGGGGGGG 12:
 :  GGGGGGGGGGGGGGGGGGGGGGGGGGGGGGGGGGGGGGGGGGGGGGGGGGGGGGG 13:
14: GGGGGGGGGGGGGGGGGGGGGGGGGGGGGGGGGGGGGGGGGGGGGGGGGGGGGGG 14:
15: GGGGGGGGGGGGGGGGGGGGGGGGGGGGGGGGGGGGGGGGGGGGGGGGGGGGGGG 15:

SCREEN   00222   00DE

0: GGGGGGGGGGGGGGGGGGGGGGGGGGGGGGGGGGGGGGGGGGGGGGGGGGGGGGG  0:
 1: GGGGGGGGGGGGGGGGGGGGGGGGGGGGGGGGGGGGGGGGGGGGGGGGGGGGGGG  1:
 2: GGGGGGGGGGGGGGGGGGGGGGGGGGGGGGGGGGGGGGGGGGGGGGGGGGGGGGG  2:
 3: GGGGGGGGGGGGGGGGGGGGGGGGGGGGGGGGGGGGGGGGGGGGGGGGGGGGGGG  3:
 4: GGGGGGGGGGGGGGGGGGGGGGGGGGGGGGGGGGGGGGGGGGGGGGGGGGGGGGG  4:
 5: GGGGGGGGGGGGGGGGGGGGGGGGGGGGGGGGGGGGGGGGGGGGGGGGGGGGGGG  5:
 6: GGGGGGGGGGGGGGGGGGGGGGGGGGGGGGGGGGGGGGGGGGGGGGGGGGGGGGG  6:
 7: GGGGGGGGGGGGGGGGGGGGGGGGGGGGGGGGGGGGGGGGGGGGGGGGGGGGGGG  7:
 8: GGGGGGGGGGGGGGGGGGGGGGGGGGGGGGGGGGGGGGGGGGGGGGGGGGGGGGG  8:
 9: GGGGGGGGGGGGGGGGGGGGGGGGGGGGGGGGGGGGGGGGGGGGGGGGGGGGGGG  9:
10: GGGGGGGGGGGGGGGGGGGGGGGGGGGGGGGGGGGGGGGGGGGGGGGGGGGGGGG 10:
11: GGGGGGGGGGGGGGGGGGGGGGGGGGGGGGGGGGGGGGGGGGGGGGGGGGGGGGG 11:
12: GGGGGGGGGGGGGGGGGGGGGGGGGGGGGGGGGGGGGGGGGGGGGGGGGGGGGGG 12:
13: GGGGGGGGGGGGGGGGGGGGGGGGGGGGGGGGGGGGGGGGGGGGGGGGGGGGGGG 13:
14: GGGGGGGGGGGGGGGGGGGGGGGGGGGGGGGGGGGGGGGGGGGGGGGGGGGGGGG 14:
15: GGGGGGGGGGGGGGGGGGGGGGGGGGGGGGGGGGGGGGGGGGGGGGGGGGGGGGG 15:
```

Having described the overall architecture of the system of the present invention, its operation can now be described. The passenger who will utilize the system is one who has arrived at the airport with reservations already made in advance, but who has not been ticketed and who will pay by credit card. He will obtain his ticket through one of the terminals 10 of the system, and may, as an option, obtain his initial boarding pass/seat selection through the terminal. If his reservation data stored in the host computer indicates advance seat selection, he may receive his initial boarding pass as his ticket is issued.

Each of the terminals 10 interacts with the host computer system 12 (FIGS. 1 and 2) through a normal communication links, such as modems coupled to telephone lines. To the host computer, each of the remote terminals 10 of the system will appear similar to conventional CRT/keyboard input terminals operated by agents of limited ability to interpret service messages.

In addition to the normal communications between each of the terminals and the host computer, each of the terminals 10 of the system is supported locally by protected read/write memory and may incorporate an optional audit tape cassette 54 (FIG. 3) for recording transaction reports locally.

Figure 5:
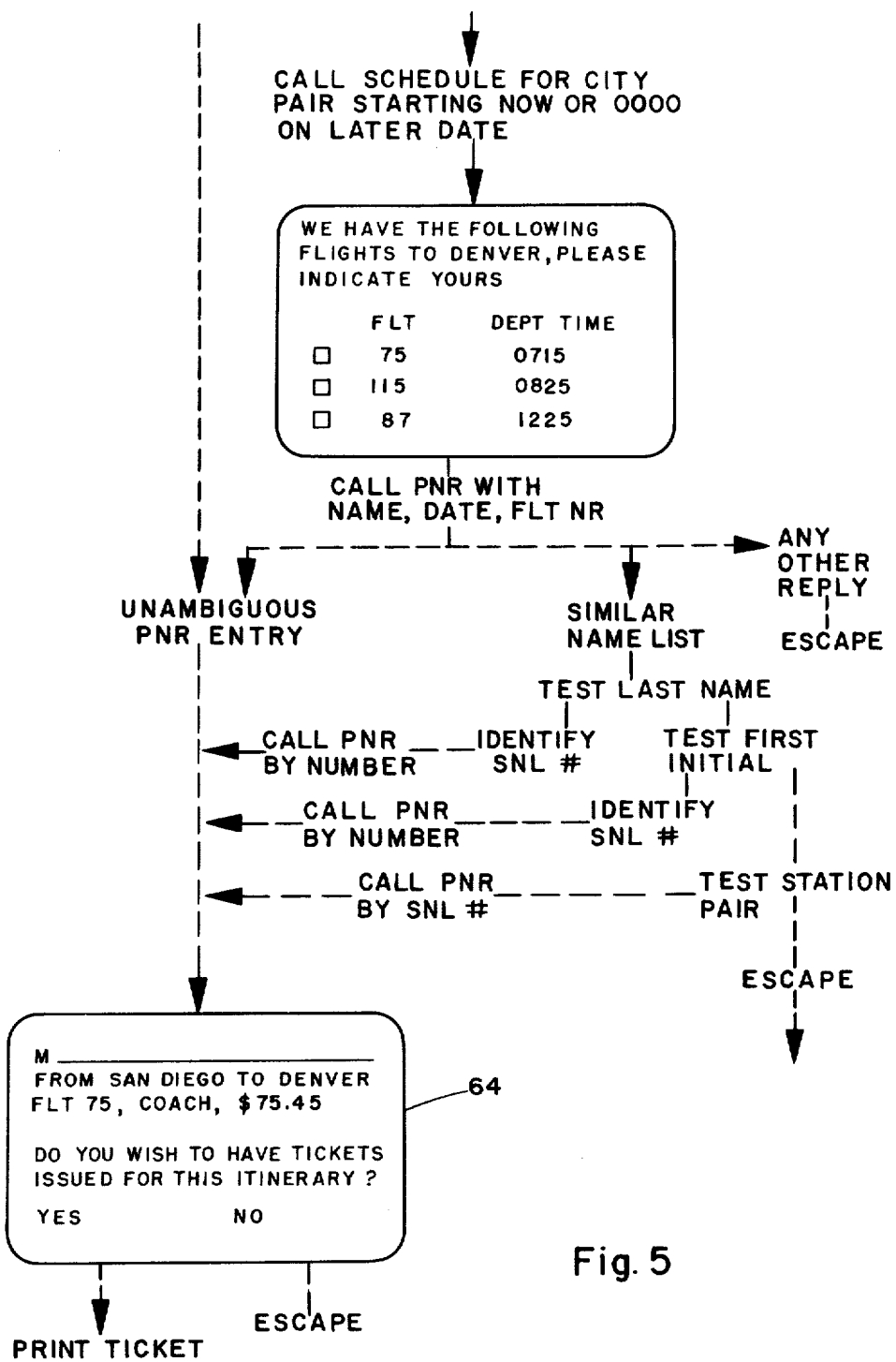
Figure 6:
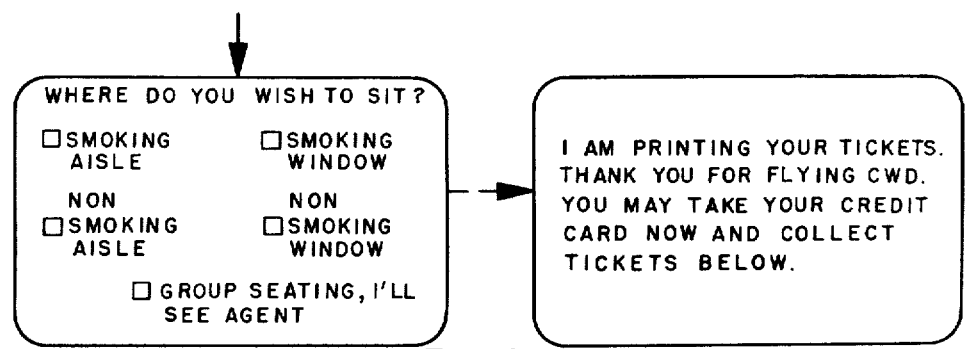

The passenger initates the ticket purchasing sequence by inserting a magnetically-encoded credit card into the credit card reader 33 (FIG. 1). The CPU 42 records the passenger name and other credit card information including the type of credit card (e.g., VISA or MASTERCARD). Remaining Passenger Name Record (PNR) data required for look-up and possible interpretation of a Similar Name List (SNL) are obtained by a sequence of inquiries presented in alphanumeric form on the CRT 30. A typical scenario of inquiries is illustrated in the flow chart of FIGS. 4–6. In this flow chart the rectangles represent the face of the CRT 30 and the information within the rectangles is that which is displayed on the CRT. Each inquiry may include alphanumeric information and graphic information.

Figure 4:
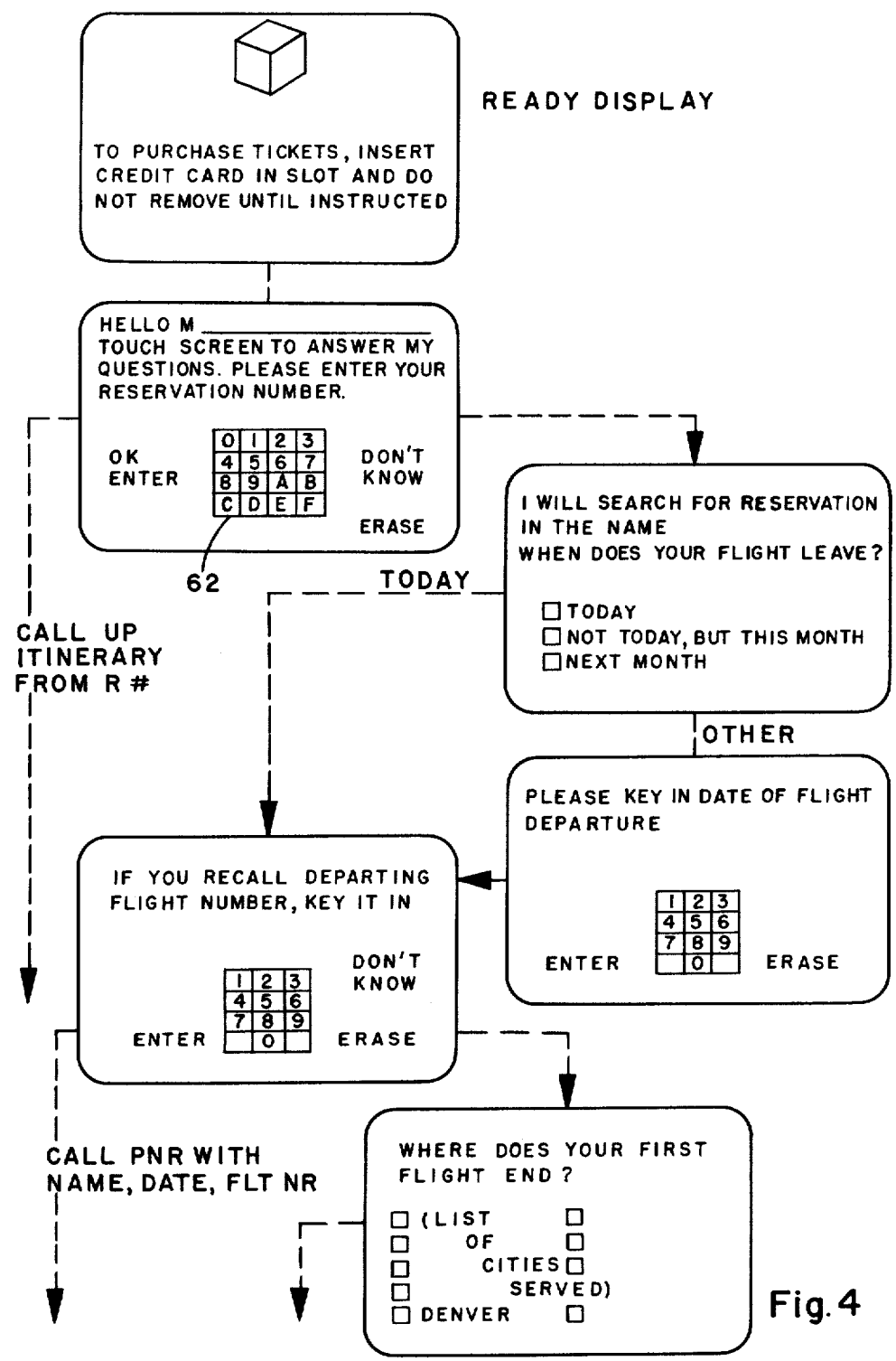
FIGS. 4–6 are a flow chart illustrating representative sequential displays depicted on the monitor of the terminal of FIGS. 1–3 in order to locate passenger reservation data and issue a ticket.

The inquiries displayed on the CRT have a number of visual response targets such as the matrix 62 of letters and numerals in FIG. 4. The passenger touches a target area on the CRT to indicate a response. The particular target area which is touched is detected by the CPU 42 through the touch panel device 34 (FIG. 2). At the same time, the CPU 42 causes the generation of an audible tone to indicate to the passenger that the response has been received.

When the flight number and date of a passenger's itinerary have been entered, the CPU 42 composes and sends a PNR search request to the host system. The CPU 42 then expects to receive either a single PNR or an abbreviated SNL. If the PNR message is received, the CPU 42 will cause the reservation data to be displayed by the monitor and will ask for confirmation by the passenger as indicated on the screen 64 in FIG. 5.

If a SNL is received, the CPU 42 will attempt to isolate the desired PNR by comparing the surname, and first-leg station pairs. If it succeeds, the CPU 42 will display the reservation data on the CRT and ask for passenger confirmation. Otherwise the CPU 42 will direct the passenger to a ticket agent.

Once the passenger confirms the reservation data, the host computer is given a "print ticket" command. The ticket or tickets described by the PNR are formated, downloaded to the printer, printed, and issued to the passenger, whose credit card is charged for the transaction. The CPU 42 sends a transaction report to the host computer at the time of purchase. Credit card purchases can thus be more quickly processed at the central host computer, thereby reducing undesirable credit card charge float.

The operational program of the terminal 10 provides three general modes of operation, namely standby, send, and listen. Standby mode is maintained when a terminal is not in either of the other two modes. In standby, the terminal recognizes a limited number of system error messages which cause a system out-of-service message to be displayed on the CRT 30 and which inhibit credit card reading.

Figure 7:
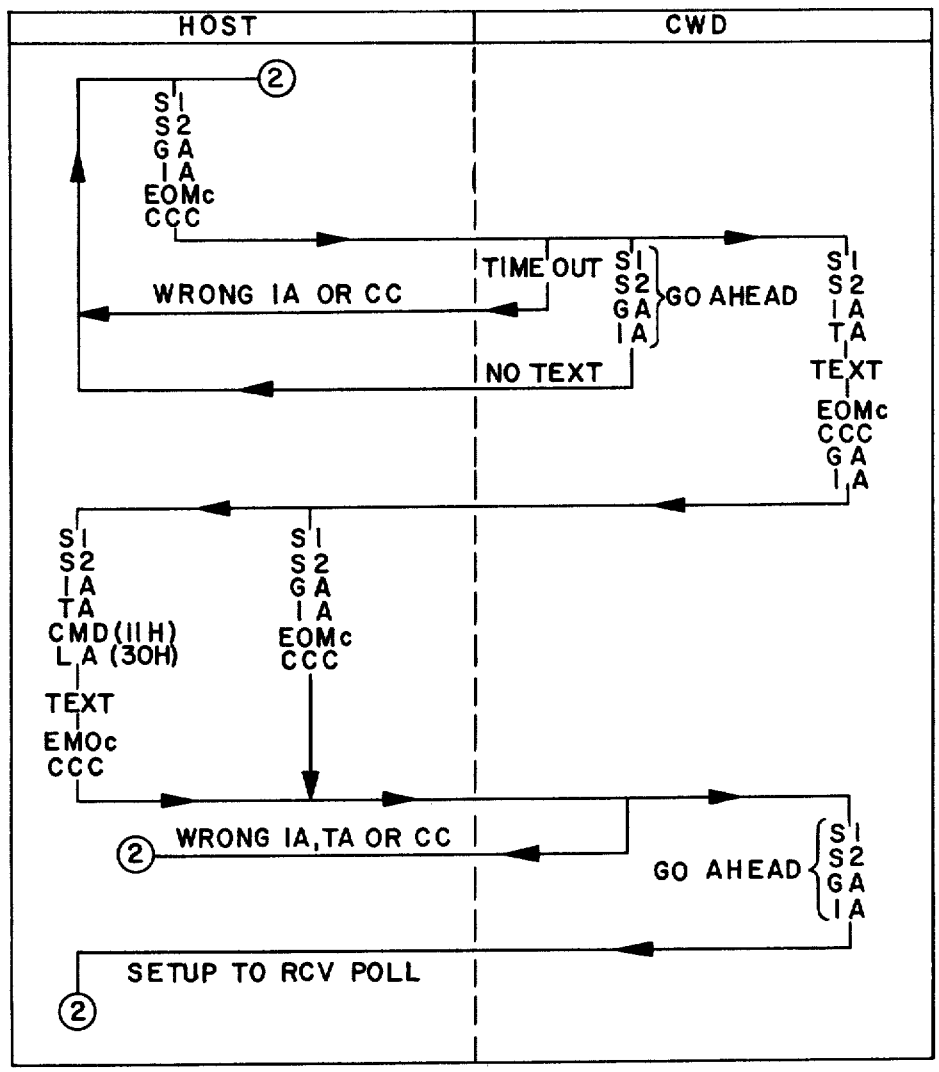
FIG. 7 depicts a typical communications protocol and sample message prosigns which may be used by the terminal of FIGS. 1-3 to communicate with the central host computer.

In the send mode, a terminal has formed a message for the central host computer. The message is formatted, protocols are added, and the message is sent. After sending the message, the terminal switches to its listening mode. In its listening mode, the terminal is programmed to look for its own ID and a limited variety of incoming messages. The messages recognized are a function of the message just sent. For example, after requesting a PNR, the terminal will recognize PNR or SNL messages. FIG. 7 depicts a typical communications protocol and sample message prosigns.

The operational program of Table I includes the passenger interface modules which form the CRT prompts, call data lists from memory to display, form targets for the active areas of the touch panel, read and interpret the response from the touch panel, and format and display appropriate down-line information, such as itinerary information. Input/output modules provide service routines for the CRT, card reader, touch screen, and printer. Custom editor modules in the program facilitate customer programming of the display screen and system interaction.

A development system 66 (FIG. 3) in the form of a CRT terminal and disk drive may be coupled directly to the CPU 42 of a given terminal 10 to provide a programmer with the capability of altering or debugging the operational program of the terminal. Once changes have been determined to be acceptable, they may be loaded into other in-service terminals by suitable communications links or by I/O port input from a tape or disk drive.

Having described a preferred embodiment of our self-ticketing system, it should be apparent to those skilled in the art that our invention may be modified in arrangement and detail. The system may be used in areas other than airline ticketing. Therefore, the protection afforded our invention should be limited only in accordance with the scope of the following claims.

We claim:

1. A passenger self-ticketing system for vending tickets based upon reservation data stored in a central host computer, the system being comprised of a plurality of ticket terminals which communicate with the host computer, each of the terminals including:
   credit card reader means for reading data from a credit card inserted therein by a passenger;
   video means including a CRT for displaying alphanumeric and graphic information including inquiries and visual response targets to the passenger;
   touch input means for enabling the passenger to respond to inquiries displayed by the video means by placing a finger on a respectively corresponding visual response target displayed on the CRT;
   printer means for generating and dispensing a ticket based upon the reservation data;
   interface means for communicating with the host computer; and
   local computer means for receiving data from the credit card reader means, causing the video means to display a sequence of inquiries and visual response targets regarding any reservation data of the passenger, which may have already been stored in the central host computer, receiving passenger responses from the touch input means, and interrogating the host computer via the interface means to determine the passenger's reservation data stored in the central host computer, if any, and further for causing the video means to display the determined reservation data and a confirm inquiry to the passenger, receiving a confirmation response from the touch input means, causing the printer means to generate and dispense a ticket base upon the passenger's reservation data, and sending a transaction report to the host computer via the interface means.

2. A system according to claim 1 wherein each terminal further comprises means for locally storing the transaction report.

3. A system according to claim 1 wherein each terminal further comprises means for generating an audible signal in response to the passenger's finger being placed on a visual response target on the CRT.

4. A system according to claim 1 wherein the touch input means comprises a plurality of infrared emitter/receiver pairs positioned around the periphery of the screen of the CRT.

5. A system according to claim 1 wherein each terminal further comprises means for enabling an operator at the terminal to input instructions in order to program the local computer means.

* * * * *